(12) United States Patent
Somberg et al.

(10) Patent No.: US 12,509,399 B2
(45) Date of Patent: Dec. 30, 2025

(54) COMPOSITE ARTICLE COMPRISING AEROGEL PARTICLES, CERAMIC AND/OR GLASS FIBERS AND OPACIFIERS

(71) Applicant: Armacell Enterprise GmbH & Co. KG, Schönefeld (DE)

(72) Inventors: Patric Somberg, Münster (DE); Pavel Holub, Münster (DE); Stephan Möller, Münster (DE); Zhicheng Zheng, Münster (DE)

(73) Assignee: ARMACELL ENTERPRISE GMBH & CO. KG, Schönefeld (DE)

( * ) Notice: Subject to any disclaimer, the term of this patent is extended or adjusted under 35 U.S.C. 154(b) by 356 days.

(21) Appl. No.: 18/007,674

(22) PCT Filed: Mar. 8, 2022

(86) PCT No.: PCT/EP2022/055902
§ 371 (c)(1),
(2) Date: Dec. 1, 2022

(87) PCT Pub. No.: WO2022/189436
PCT Pub. Date: Sep. 15, 2022

(65) Prior Publication Data
US 2023/0219851 A1    Jul. 13, 2023

(30) Foreign Application Priority Data
Mar. 9, 2021  (EP) .................................. 21161398

(51) Int. Cl.
C04B 30/02    (2006.01)
C04B 14/46    (2006.01)
(Continued)

(52) U.S. Cl.
CPC .......... *C04B 30/02* (2013.01); *C04B 14/4656* (2013.01); *C04B 28/24* (2013.01);
(Continued)

(58) Field of Classification Search
CPC ..... C04B 26/12; C04B 14/024; C04B 14/064; C04B 14/42; C04B 14/4656; C04B 24/00;
(Continued)

(56) References Cited

U.S. PATENT DOCUMENTS 4,399,175 A    8/1983   Kummermehr et al.
5,973,015 A    10/1999  Coronado et al.
(Continued)

FOREIGN PATENT DOCUMENTS

CN    101041770 A    9/2007
CN    101100370 A    1/2008
(Continued)

OTHER PUBLICATIONS

Office Action issued Jan. 23, 2024 in AZ Application No. a 2023 0112.
(Continued)

*Primary Examiner* — Joseph D Anthony
(74) *Attorney, Agent, or Firm* — Panitch Schwarze Belisario & Nadel LLP

(57) ABSTRACT

A method for the preparation of a composite article containing aerogel particles, graphite and ceramic and/or glass fibers, as well as to a composite article obtained by this method, are described.

13 Claims, 6 Drawing Sheets a)

b)

(51) Int. Cl.
*C04B 28/24* (2006.01)
*C04B 35/14* (2006.01)
*C04B 35/626* (2006.01)
*C04B 38/00* (2006.01)
*C04B 41/46* (2006.01)
*C04B 41/50* (2006.01)
*C04B 111/28* (2006.01)

(52) U.S. Cl.
CPC .......... *C04B 35/14* (2013.01); *C04B 35/6264* (2013.01); *C04B 38/0045* (2013.01); *C04B 41/463* (2013.01); *C04B 41/5035* (2013.01); *C04B 2111/28* (2013.01); *C04B 2111/285* (2013.01); *C04B 2201/00* (2013.01); *C04B 2201/30* (2013.01); *C04B 2235/3418* (2013.01); *C04B 2235/5228* (2013.01); *C04B 2235/526* (2013.01); *C04B 2235/9607* (2013.01)

(58) Field of Classification Search
CPC ......... C04B 24/02; C04B 26/32; C04B 28/26; C04B 30/02
See application file for complete search history.

(56) References Cited

U.S. PATENT DOCUMENTS

| | | | |
|---|---|---|---|
| 6,083,619 | A | 7/2000 | Frank et al. |
| 6,770,584 | B2 | 8/2004 | Barney et al. |
| 7,811,711 | B2 * | 10/2010 | Cooper ............. C04B 35/62655 429/408 |
| 8,480,916 | B2 | 7/2013 | Fernando et al. |
| 8,999,251 | B2 | 4/2015 | Sasaki et al. |
| 10,633,256 | B1 * | 4/2020 | Guo ..................... B01J 13/0091 |
| 2014/0273701 | A1 | 9/2014 | Samanta et al. |
| 2018/0022059 | A1 | 1/2018 | Dill et al. |
| 2020/0062661 | A1 * | 2/2020 | Geisler .................. C04B 41/71 |
| 2020/0231834 | A1 | 7/2020 | Izumi et al. |
| 2023/0212079 | A1 | 7/2023 | Somberg et al. |
| 2023/0227364 | A1 | 7/2023 | Somberg et al. |

FOREIGN PATENT DOCUMENTS

| | | |
|---|---|---|
| CN | 102897778 A | 1/2013 |
| CN | 102985388 A | 3/2013 |
| CN | 106120439 A | 11/2016 |
| CN | 106486194 A | 3/2017 |
| CN | 106753437 A | 5/2017 |
| CN | 107954687 A | 4/2018 |
| CN | 107986743 A | 5/2018 |
| CN | 107986744 A | 5/2018 |
| CN | 108046739 A | 5/2018 |
| CN | 108083760 A | 5/2018 |
| CN | 108793943 A | 11/2018 |
| CN | 109563000 A | 4/2019 |
| CN | 110845145 A | 2/2020 |
| CN | 111070819 A | 4/2020 |
| CN | 111848106 A | 10/2020 |
| CN | 112301732 A | 2/2021 |
| DE | 102017127388 A1 | 6/2018 |
| EP | 2722311 A2 | 4/2014 |
| EP | 3023528 A1 | 5/2016 |
| IN | 107000376 A | 8/2017 |
| RU | 2169131 C2 | 6/2001 |
| TW | 201144499 A | 12/2011 |
| WO | 2018210605 A1 | 11/2018 |
| WO | 2020016036 A1 | 1/2020 |

OTHER PUBLICATIONS

International Search Report issued May 30, 2022 in International Application No. PCT/EP2022/055902.
International Search Report issued May 25, 2022 in International Application No. PCT/EP2022/055879.
Extended European Search Report issued Sep. 2, 2021 in EP 21161398.9.
Li et al., "A review of silicon-based aerogel thermal insulation materials: Performance optimization through composition and microstructure," Journal of Non-Crystalline Solids, vol. 553, 120517 (2021).
International Search Report issued May 25, 2022 in International Application No. PCT/EP2022/055895.
International Preliminary Report on Patentability mailed Sep. 21, 2023 in International Application No. PCT/EP2022/055879.
International Preliminary Report on Patentability mailed Sep. 21, 2023 in International Application No. PCT/EP2022/055895.
International Preliminary Report on Patentability mailed Sep. 21, 2023 in International Application No. PCT/EP2022/055902.
Office Action issued Apr. 24, 2025 in U.S. Appl. No. 18/007,563, by Somberg.
Office Action issued Apr. 24, 2025 in U.S. Appl. No. 18/007,642, by Somberg.
Office Action issued in AE Application No. P6002338/2022 (undated).
Office Action and Search Report issued Aug. 12, 2025 in TW Application No. 111108371, and English machine translation of the Office Action.
Office Action and Search Report issued Aug. 12, 2025 in TW Application No. 111108373, and English machine translation of the Office Action.
Office Action and Search Report issued Sep. 2, 2025 in TW Application No. 111108372, and English machine translation of the Office Action.
Office Action issued Aug. 29, 2025 in CN Application No. 202280003904.2.
Office Action issued Aug. 30, 2025 in CN Application No. 202280003897.6, with English translation of Office Action and Search Report.

* cited by examiner a) b)

a) b)

a) b)

COMPOSITE ARTICLE COMPRISING AEROGEL PARTICLES, CERAMIC AND/OR GLASS FIBERS AND OPACIFIERS

CROSS-REFERENCE TO RELATED APPLICATIONS

This application is a Section 371 of International Application No. PCT/EP2022/055902, filed Mar. 8, 2022, which was published in the English language on Sep. 15, 2022 under International Publication No. WO 2022/189436 A1, which claims priority under 35 U.S.C. § 119(b) to European Application No. 21161398.9, filed Mar. 9, 2021, the disclosures of which are incorporated herein by reference in their entireties.

The present invention relates to a method for the preparation of a composite article comprising aerogel particles, graphite and ceramic and/or glass fibers as well as to a composite article obtainable by this method. It is to be understood that graphite may be used in conjunction with other opacifiers, preferably as a synergist.

In many industrial and construction applications such as passive fire protection for structural steel beams, thermal insulation capability and temperature resistance at very high temperatures are required. UL1709 (Rapid Rise Fire Tests of Protection Materials for Structural Steel) requires a test temperature of 1093° C. and ISO834 (cellulosic fire curve) requires temperature to reach 1110° C. after a test period of 180 min. Novel insulation materials with thermal insulation capability and temperature resistance at elevated temperatures higher than 1100° C. need to be developed.

Currently, various grades of ceramic fiber blankets are applied as insulation materials for applications above 1000° C. On the one hand, the variations in chemical composition of ceramic fiber blankets lead to different temperature resistance. Thus, ceramic fiber blankets based on alkaline earth silicate (AES) are resistant to operating temperatures up to 1200° C., while ceramic fiber blankets based on aluminum oxide (AO) can withstand 1600° C. On the other hand, the various chemical compositions lead to significant differences in material costs of ceramic fiber blankets. The costs of ceramic fiber blankets based on aluminum oxide are typically about 20 times the costs of ceramic fiber blankets based on alkaline earth silicate. A sharp increase in material cost can be observed with the increase in the temperature resistance requirement.

In view of the prior art, the present invention serves to provide ceramic fiber blankets with improved thermal insulation capability and temperature resistance at reduced costs.

The present inventors surprisingly found that this problem can be solved by incorporating aerogel into ceramic fiber blankets after the fiber blankets have been formed. This can be achieved by preparing an aerogel composition comprising an aerogel powder and an organic solvent and injecting it into the fiber blanket. Due to this approach, the use of binders can be reduced or even entirely avoided, while still obtaining an excellent attachment of the aerogel powder to the fibers of the fiber blanket.

Furthermore, the present inventors considered the problem that silica aerogels are transparent to infrared radiation and therefore typically do not have the capability to efficiently block the radiative portion of heat transfer in high-temperature applications equal or above 200° C. In order to achieve efficient absorption or scattering of the IR radiation opacifiers need to be used. Opacifiers such as manganese ferrite, SnO, TiC, tungsten carbide, titanium oxide, zirconium oxide, iron (II) oxide, iron (III) oxide, silicon carbide and others are described in the literature for certain applications, as well as the dependency on the particle size distribution on the efficiency of said opacifiers. However, a variety of problems have been encountered when trying to find suitable opacifiers for aerogel-filled products, not only in terms of efficiency but also in terms of stability, uniformity and reliability when used in such products. The present invention surprisingly found that graphite has excellent opacifying properties in the aerogel-filled products described herein. Furthermore, a synergistic effect has been found for a mixture of graphite with manganese-ferrite $(Mn,Fe)_2O_3$ in particular when mixed in a 50:50 weight ratio of graphite to manganese-ferrite, which expresses itself in even lower thermal conductivities at temperatures lower than or equal to 400° C. These results are not only applicable to aerogel articles comprising ceramic fibers but also to aerogel articles comprising glass-fibers.

Thus, in a first aspect, the present invention relates to a method for the preparation of a composite article comprising aerogel particles, graphite and ceramic and/or glass fibers, the method comprising:
  providing a fibrous article comprising ceramic and/or glass fibers,
  providing an aerogel composition comprising an aerogel powder, graphite and an organic solvent,
  combining the fibrous article and the aerogel composition, and
  partially or completely removing the organic solvent to obtain the composite article.

The graphite is preferably used as opacifier and is more preferably used as a synergist in conjunction with other opacifiers.

The present invention furthermore relates to a composite article obtainable by this method.

In addition, the invention relates to a composite article comprising aerogel particles, graphite and ceramic and/or glass fibers, wherein the composite article is obtainable by injecting, or impregnating, or soaking an aerogel composition comprising an aerogel powder, graphite and an organic solvent, and optionally further inorganic opacifiers and/or mineral fillers, into a fibrous article comprising ceramic and/or glass fibers, and partially or completely removing the organic solvent to obtain the composite article.

In still a further aspect, the present invention relates to a composite article comprising aerogel particles, graphite and ceramic and/or glass fibers, wherein one or more of the following requirements (i) to (vii) are fulfilled:
  (i) the composite article contains less than 15% by weight organic compounds;
  (ii) at least 50% of the fibers in the composite article have a length of 5 mm or more;
  (iii) the composite article contains less than 10% by weight binder;
  (iv) the composite article exhibits a total weight loss in thermogravimetric analysis (TGA) when being heated in a nitrogen atmosphere from 30° C. to 1100° C. with a temperature increase of 10° C./min of less than 35% by weight;
  (v) the weight ratio of the one or more aerogels to the one or more fibers (aerogel/fiber) in the composite article is 1:8 or higher;
  (vi) the composite article has a burn-through time of 60 minutes or more, wherein the burn-through resistance is determined using the composite article in the form of a 30 cm×30 cm sheet with a thickness of 13 mm and treating the composite article at the centre of its first major surface with a flame having a temperature of 1400° C., using a soldering torch, wherein the burn-through time is the duration from start of the flame treatment until the centre of the second major surface reaches a temperature of 1000° C.;

(vii) when using the composite article in the form of a 20 cm×50 cm sheet with a thickness of 13 mm and treating the composite article at the full surface of its first major surface in accordance with the ISO 834 temperature-time curve for 180 minutes, the centre of the second major surface has a temperature of less than 1000° C.

DEFINITION OF THE TERMS USED HEREIN

Figure 1:
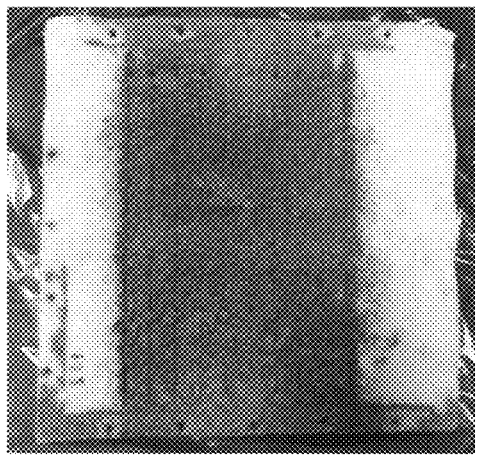
FIG. 1: Aerogel-incorporated ceramic fiber blanket (raw blanket density 128 kg/m$^3$) (Example 1-1) a) top view; b) side view
Figure 1:
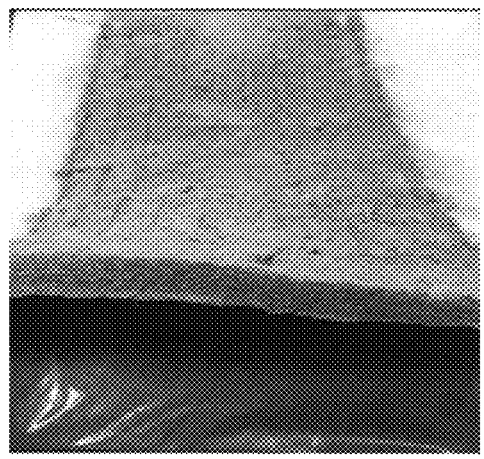

In the context of the present invention, the term "composite article" is to be understood as referring to any article which comprises one or more aerogel particles, graphite and one or more ceramic and/or glass fibers. Thus, the term "composite" does not imply any limitations other than the presence of aerogel particles, graphite and ceramic and/or glass fibers, which together form the article. It is to be understood that the aerogel particles and the ceramic and/or glass fibers are not spatially distant. Rather, the aerogel particles are typically between and around the ceramic and/or glass fibers. Preferably, the one or more fibers form a woven or non-woven structure, in and around which the aerogel particles are present.

The composite article is typically in the form of batting, nonwovens, mats, felts or blankets, such as needled fiber blankets. It is preferably a nonwoven fiber blanket or a needled fiber blanket, wherein the aerogel particles are present. The term "nonwoven" is to be understood as also including needled fiber blankets. The composite article preferably has a thickness in the range of 3 mm to 500 mm, preferably in the range of 3 to 100 mm, more preferably in the range of 3 to 50 mm, even more preferably in the range of 5 to 30 mm. The extension in the other two dimensions is preferably each at least 5 times the thickness. It is to be understood that the term "dimension" as used herein refers to the three known space dimensions which are orthogonal to each other (such as understood in "3-dimensional").

The term "batting" as used herein refers to a layer or sheet of fibrous material, the fibrous material typically comprising the ceramic and/or glass fibers.

The term "nonwoven" refers to any material containing fibers which is neither woven nor knitted.

The term "nonwoven fiber blanket" is to be understood as relating any material containing fibers which is neither woven nor knitted, wherein the material is in the form of a blanket.

The term "needled fiber blanket" is to be understood as relating to any material containing fibers wherein the fibers are needled and wherein the material is in the form of a blanket.

As used herein, the term "blanket" typically refers to an article which extends into one dimension less than in the other two dimensions. Preferably, it refers to an article which extends in one dimension only up to 1000 mm, preferably up to 500 mm, more preferably up to 100 mm, while extending at least 5 times as much in each of the other two dimensions. In other words, the term "blanket" typically refers to flat articles, or oblong articles.

Unless otherwise explicitly indicated, the use of singular or plural forms should be understood as allowing the presence of "one or more" of the nouns being in singular or plural form. In particular, the term "fibrous article comprising ceramic and/or glass fibers" refers to a "fibrous article comprising one or more ceramic and/or glass fibers". Similarly, the term "aerogel composition comprising an aerogel powder, graphite and an organic solvent" is to be understood as also including the case where more than one (type of) aerogel powder and/or more than one (type of) organic solvent are comprised in the aerogel composition. Mixtures of different types of aerogel powders and/or mixtures of different types of organic solvents may be used.

As used herein, the term "aerogel" refers to a porous material derived from a gel, in which the liquid component of the gel has been replaced with a gas essentially without collapse of the gel structure. Preferably, the "aerogel" is a silica aerogel. Such silica aerogels typically have a density of 0.1 g/cm$^3$ or less, preferably 0.05 g/cm$^3$ or less, and can be prepared by the well-known Stober process. In the present invention, the "aerogel" is preferably a silica aerogel which is obtainable according to the process described in EP 2 722 311 A2, preferably as defined in claim 22 thereof.

In the present invention, the term "aerogel particle" preferably refers to silica aerogel particles which are obtainable according to the process described in EP 2 722 311 A2, preferably as defined in claim 22 thereof. Aerogel particles suitable for use in the present invention are, e.g., commercially available as "Jios AeroVa", wherein the "D20 Grade" is preferred. "Jios AeroVa D20 Grade" is described as having a D95 particle size range of less than 20 μm, a bulk density of 0.03 to 0.1 g/cm$^3$, a thermal conductivity of 0.017 to 0.022 W/m·k, a surface area of 600 to 800 m$^2$/g, and a porosity of more than 90%.

The term "heterophase reaction" preferably refers to any reaction conducted in a system containing more than one phase e.g. in a system composed of two non-mixable phases i.e. an aqueous phase and a phase which is not mixable with the aqueous phase, which is preferably a non-polar solvent phase. The reactions i.e. the creation of the first structures start at the interface between the different phases. Accordingly, it does not relate to reactions in which all reactants are dissolved in the same solvent. An example of a "heterophase reaction" is an emulsion reaction, suspension reaction or dispersion reaction.

The term "ceramic" preferably refers to any material which is inorganic, non-metallic and preferably amorphous. It typically relates to one or more inorganic materials selected from oxides, nitrides and carbides, including any mixtures thereof. Preferably, the "ceramic" material contains at least 90 wt.-% (preferably at least 95 wt.-%, more preferably 99 wt.-%) of a total of one or more oxides, nitrides and/or carbides of silicon, aluminium, cerium, zirconium and/or alkaline earth metal(s).

The term "fiber" as used herein preferably refers to an article which extends in a first dimension at least 10 times more than in any of the other two dimensions. The first dimension preferably corresponds to the length direction of the fiber.

The term "fibrous article" refers to any article comprising one or more fibers. Examples therefore include batting, nonwovens, mats, felts and needled fiber blankets. Preferred examples are a nonwoven fiber blanket or a needled fiber blanket. The fibrous article preferably has a thickness in the range of 3 mm to 500 mm, preferably in the range of 3 to 100 mm, more preferably in the range of 3 to 50 mm, even more preferably in the range of 5 to 30 mm, while extending at least 5 times as much in each of the other two dimensions.

As used herein, the term "aerogel composition" relates to any mixture comprising an aerogel powder, graphite and an organic solvent. Preferably, the "aerogel composition" is a mixture comprising the aerogel powder and graphite dispersed in an organic solvent. In other words, the "aerogel composition" is preferably an "aerogel dispersion".

The term "dispersion" as used herein preferably relates to a mixture wherein solid particles of one material are dispersed in a continuous phase of another material which is liquid. The terms solid and liquid as used herein refer to the state of a material at a temperature of 25° C. and a pressure of 1 atm. Being "dispersed" preferably describes a state where the particles do not readily settle in the continuous phase of the liquid.

As used herein, the term "organic solvent" refers to any organic compound which is liquid at a temperature of 20° C. and a pressure of 1 atm. Preferred examples of organic solvents include hydrocarbon solvents and alcohols including any mixtures thereof. Hydrocarbons are understood to be organic compounds consisting of carbon and hydrogen atoms.

The term "organic compound" as used herein relates to any compounds containing at least one carbon-hydrogen bond.

Terms such as "comprise" or "contain", such as in "A comprises B", are used herein to express an open definition of a composition etc. Accordingly, "A comprises B" is to be understood as indicating that A comprises at least B but may furthermore contain any number and amount of other components. In contrast, the term "consists of" such as in "A consists of B" typically indicates that A does not contain components other than B.

Terms such as "preferably" indicate that a certain feature may or may not be fulfilled. Such terms therefore precede optional features. Generally, if the feature is fulfilled, it is expected that additional beneficial effects may result.

The term "injecting" as used herein refers to the action of introducing (typically with force) a fluid (such as the aerogel composition) into a solid material (such as the fibrous article). A suitable approach for "injecting" is, e.g., described in EP 3 023 528 A1.

The term "impregnating" or "soaking" as used herein refers to the action of introducing (typically without force) a fluid (such as the aerogel composition) into a solid material (typically a solid porous material; such as the fibrous article). The "impregnating" or "soaking" can for example be achieved either by placing the article to be impregnated or soaked in a container which contains the typically liquid material with which the article is to be impregnated or in a way that the liquid is poured over the article to be impregnated or soaked.

As used herein, the term "binder" relates to any materials which are intended to provide adhesion between two solid materials. Preferably, the term "binder" relates to any materials which serve to bind aerogel particles to each other and/or to ceramic and/or glass fibers. The binders may be of organic or inorganic nature. Particular examples of binders include, but are not limited, to water glass, silicone-based binders and phenolic resin-based binders.

DETAILED DESCRIPTION OF THE PRESENT INVENTION

The present invention relates to a method for the preparation of a composite article comprising aerogel particles, graphite and ceramic and/or glass fibers as well as to a composite article obtainable by this method.

The Method

The present invention concerns a method for the preparation of a composite article comprising aerogel particles, graphite and ceramic and/or glass fibers, the method comprising:

providing a fibrous article comprising ceramic and/or glass fibers, providing an aerogel composition comprising an aerogel powder, graphite and an organic solvent, combining the fibrous article and the aerogel composition, and partially or completely removing the organic solvent to obtain the composite article.

The method is not limited to these steps and may include any number of additional steps before, between and after each of these steps. The steps mentioned above are thus not necessarily consecutive steps. However, it is preferred that they be conducted in the order specified. Furthermore, it is preferred that the steps be consecutive.

The steps of the method described herein may each include additional activities. For example, the step of providing an aerogel composition comprising an aerogel powder and an organic solvent may include providing the aerogel composition containing additional components other than the aerogel powder and the organic solvent. Furthermore, the step of combining the fibrous article and the aerogel composition may include combining not only the fibrous article and the aerogel composition but further articles, compositions etc.

The fibrous article and the aerogel composition are preferably combined by injecting the aerogel composition into the fibrous article. Suitable methods for injecting such a composition are known to the skilled person and, e.g., described in EP 3 023 528 A1.

It is contemplated that the graphite and other opacifiers and/or fillers may, instead of or in addition to being in the aerogel composition, be injected (preferably in the form of a composition comprising the graphite and an organic solvent as described herein) into the fibrous article before or after the aerogel composition is/has been injected into the fibrous article. However, it is preferred that the graphite be present in the aerogel composition such that it is introduced into the fibrous article together with the other components of the aerogel composition.

Preferably, the partially or completely removing the organic solvent to obtain the composite article by drying includes drying at a temperature of 50 to 170° C. for 1 to 8 hours, optionally followed by drying at 171° C. to 230° C. for 1 to 48 hours.

The Composite Article to be Obtained by the Method

The composite article obtainable by the method of the present invention preferably contains 15 to 70 wt.-% aerogel based on the total weight of the composite article. More preferred is 25 to 60 wt %, still more preferred is 35 to 50 wt % aerogel based on the total weight of the composite article.

The thickness of the composite article is typically in the range of 3 mm to 500 mm, preferably in the range of 3 to 100 mm, more preferably in the range of 3 to 50 mm, even more preferably in the range of 5 to 30 mm.

When the width of the composite article is W, the length of the composite article is L and the thickness of the composite article is T, the following requirement is preferably fulfilled by the composite article:

$$R = \frac{W \times L}{T^2}$$

wherein R is 100 or more, preferably 1000 or more, more preferably 10000 or more,
wherein W/L is preferably in a range of 1000/1 to 1/1000,
wherein W/T is preferably 10 or more, and
wherein L/T is preferably 10 or more.

In order to achieve excellent flame resistance, the composite article typically contains less than 15% by weight organic compounds, preferably less than 10% by weight organic compounds, more preferably less than 5% by weight organic compounds, even more preferably less than 2% by weight organic compounds, still more preferably less than 1% by weight organic compounds, most preferably less than 0.5% by weight organic compounds, based on the total weight of the composite article. The term organic compound typically relates to any compounds containing at least one carbon-hydrogen bond.

By the method of the present invention, it is possible to ensure that at least 50% of the fibers in the composite article have a length of 5 mm or more. Preferably at least 50% of the fibers in the composite article have a length of 10 mm or more, more preferably wherein at least 75% of the fibers in the composite article have a length of 5 mm or more, even more preferably wherein at least 75% of the fibers in the composite article have a length of 10 mm or more, still more preferably wherein at least 75% of the fibers in the composite article have a length of 15 mm or more, most preferably wherein at least 75% of the fibers in the composite article have a length of 20 mm or more.

To improve flame resistance and costs, the composite article typically contains less than 10% by weight binder, preferably less than 5% by weight binder, more preferably less than 2% by weight binder, even more preferably less than 1% by weight binder, still more preferably less than 0.5% by weight binder, most preferably less than 0.1% by weight binder. Furthermore, the reduction in the amount of binder may be beneficial for flame resistance, cohesion and insulating properties of the composite article as more fibers and/or aerogel can be incorporated in the composite article.

The methods used in the prior art generally require the use of a binder to ensure the structural integrity of the composite articles by binding the fibers to each other and to the fillers. As the present invention allows the use of a fibrous article as a starting material, instead of a slurry of fibers and fillers, the amount of binder can be considerably reduced.

Due to the use of the inventive method, the composite article may exhibit a total weight loss, in thermogravimetric analysis (TGA) when being heated in a nitrogen atmosphere from 30° C. to 1100° C. with temperature ramp of 10° C./min, of less than 35% by weight, preferably less than 30% by weight, more preferably less than 25% by weight, even more preferably less than 20% by weight, still more preferably less than 15% by weight, most preferably less than 10% by weight, based on the total weight of the composite article before the thermogravimetric analysis.

Furthermore, it is possible to achieve a weight ratio of the one or more aerogels to the one or more fibers (aerogel/fiber) in the composite article is 1:8 or higher, preferably 1:4 or higher, more preferably 1:2 or higher, even more preferably 1:1 or higher. In the prior art methods, which are typically based on drying a dispersion of fibers, the amount and length of fibers which can stably be included in the fiber blankets is severely limited, i.a. due to the required use of a considerable amount of binder.

The composite article may, in addition to graphite, further comprise other inorganic opacifiers and/or mineral fillers. Accordingly, it is preferred that the step of providing an aerogel composition comprising an aerogel powder and an organic solvent, is a step of providing an aerogel composition comprising an aerogel powder and an organic solvent and inorganic opacifiers and/or mineral fillers.

The Fibrous Article

The fibrous article is preferably selected from batting, nonwovens, mats, felts and needled fiber blankets which are preferably prepared via an air-lay or a carding process, wherein the fibrous article is preferably a nonwoven fiber blanket or a needled fiber blanket. The fibrous article preferably contains 90 wt.-% or more, more preferably 95 wt.-% or more, even more preferably 98 wt.-% or more, of ceramic and/or glass fibers.

It is to be understood that the term "ceramic and/or glass fibers" indicates that ceramic fibers and/or glass fibers may be present. In other words, it relates in particular to:
  i) ceramic fibers and glass fibers,
  ii) ceramic fibers (but no glass fibers), and
  iii) glass fibers (but no ceramic fibers).

When ceramic fibers are preferred, typically 50 wt.-% or more, preferably 60 wt.-%, more preferably 70 wt.-%, even more preferably 80 wt.-%, still preferably 90 wt.-% or more, even still more preferably 95 wt.-% or more, or even more 98 wt.-% or more, or even more preferably all of the fibers in the fibrous article and/or the composite article are ceramic fibers.

When glass fibers are preferred, typically 50 wt.-% or more, preferably 60 wt.-%, more preferably 70 wt.-%, even more preferably 80 wt.-%, still preferably 90 wt.-% or more, even still more preferably 95 wt.-% or more, or even more 98 wt.-% or more, or even more preferably all of the fibers in the fibrous article and/or the composite article are glass fibers.

It is preferred that the term "ceramic and/or glass fibers" be "ceramic fibers".

It is furthermore preferred that the fibrous article has a density of 20 to 300 kg/m³, preferably 50 to 200 kg/m³, more preferably 80 to 150 kg/m³.

Preferred examples of fibrous articles to be used in the present invention are (amounts in wt.-%)):

Fiberfrax Duraback by Unifrax, having a recommended operating temperature of 982° C., available with a density of 64 kg/m' (typically having a chemical composition including 31-35% $Al_2O_3$, 50-54% $SiO_2$, 5% $ZrO_2$, 1.30% $Fe_2O_3$, 1.70% $TiO_2$, 0.50% MgO, and 57.5% CaO);

Fiberfrax Durablanket S by Unifrax, having a recommended operating temperature of 1177° C., available with densities of 64, 96 and 128 kg/m³ (typically having a chemical composition including 43-47% $Al_2O_3$, 53-57% $SiO_2$, <1% $Fe_2O_3$, and <1% $TiO_z$);

Fiberfrax Durablanket HP-S by Unifrax, having a recommended operating temperature of 1204° C., available with densities of 64, 96 and 128 kg/m³ (typically having a chemical composition including 43-47% $Al_2O_3$, and 53-57% $SiO_2$);

Fiberfrax Durablanket 2600 by Unifrax, having a recommended operating temperature of 1343° C., available with densities of 96 and 128 kg/m³ (typically having a chemical composition including 29-31% $Al_2O_3$, 53-55% $SiO_2$, 15-17% $ZrO_2$);

Fiberfrax PH blanket by Unifrax, having a recommended operating temperature of 1177° C., available with a density of 96 kg/m³ (typically having a chemical composition including 43-47% $Al_2O_3$, 53-55% $SiO_2$, <1% $Fe_2O_3$, and <1% $TiO_2$);

Fiberfrax Moist Pak-D by Unifrax, having a recommended operating temperature of 1010° C., available with densities of 190-290 kg/m³ (typically having a chemical composition including 23-32% $Al_2O_3$ and 68-77% $SiO_2$);

Fiberfrax Fibermat Blanket by Unifrax, having a recommended operating temperature of 677° C., available with a density of 88 kg/m³ (typically having a chemical composition including 29-47% $Al_2O_3$, 52-57% $SiO_2$, and less than 18% $ZrO_2$);

Fibermax Mat by Unifrax, having a recommended operating temperature of 1566° C., available with a density of 24 kg/m³ (typically having a chemical composition including 72% $Al_2O_3$, 27% $SiO_2$, 0.02% $Fe_2O_3$, 0.001% $TiO_2$, 0.05% MgO, and 0.05% CaO);

Fibermax Needled Blanket by Unifrax, having a recommended operating temperature of 1600° C., available with densities of 100 and 130 kg/m³ (typically having a chemical composition including 72% $Al_2O_3$, 27% $SiO_2$, 0.02% $Fe_2O_3$, 0.001% $TiO_2$, 0.05% MgO, and 0.05% CaO);

Insulfrax LTX Blanket by Unifrax, having a recommended operating temperature of 1100° C., available with densities of 64, 96, 128 and 160 kg/m³ (typically having a chemical composition including <1% $Al_2O_3$, 61-67% $SiO_2$, <0.6% $Fe_2O_3$, 2.5-6.5% MgO, and 27-33% CaO);

Insulfrax S Blanket by Unifrax, having a recommended operating temperature of 1100° C., available with densities of 64, 96 and 128 kg/m³ (typically having a chemical composition including 61-67% $SiO_2$, 2-7% MgO, and 27-33% CaO);

Isofrax 1400 Blanket by Unifrax, having a recommended operating temperature of 1300° C., available with densities of 96, 128 and 160 kg/m³ (typically having a chemical composition including 70-80% $SiO_2$ and 18-27% MgO);

"CERAKWOOL New-Bio" by KCC, available with densities of 96, 128 and 160 kg/m³ (typically having a chemical composition including <1% $Al_2O_3$, 58-67% $SiO_2$, 2-8% MgO, and 26-34% CaO);

Superwool plus blanket SPB by New Fire, having a recommended operating temperature of 1050° C., available with densities of 96 and 128 kg/m³ (typically having a chemical composition including 62-68% $SiO_2$, 3-7% MgO, and 26-32% CaO);

Saffil Blanket & Mat by Unifrax, having a recommended operating temperature of 1600° C., available with densities of 35, 96 kg/m³ (typically having a chemical composition including 95-97% $Al_2O_3$ and 3-5% $SiO_2$);

isoTherm S Vlies by Frenzelit, having a recommended operating temperature of 1100° C. (typically having a chemical composition including >94% $SiO_2$).

Among these, the following are preferred:

Fiberfrax Duraback, Fiberfrax Durablanket S, Fiberfrax Durablanket 2600, Fiberfrax Moist Pak-D, Fibermax Needled Blanket, Insulfrax LTX Blanket, Insulfrax S Blanket, Isofrax 1400 Blanket, Saffil Blanket & Mat, and isoTherm S Vlies.

Preferred examples of fibrous articles containing glass fibers to be used in the present invention are (amounts in wt.-%)):

E-glass Fiber Needle Mat by Lih Feng Jing, having a recommended operating temperature of 650° C. (typically having a chemical composition including 52-56% $SiO_2$, 12-16% $Al_2O_3$, 0-6% MgO, and 15-25% CaO, 4-9% 8203, 0-1% $Na_2O+K_2O$);

isoGLAS needlemat by Frenzelit, having a recommended operating temperature of 550° C. (typically having a chemical composition including 52-56% $SiO_2$, 12-16% $Al_2O_3$, 0-6% MgO, and 15-25% CaO, 6-13% $B_2O_3$, 0.3-2% $Na_2O$).

The Ceramic Fibers

The ceramic fibers may generally be structured into three classes of fibers
 a) ceramic fibers containing 80 wt.-% or more of alumina,
 b) ceramic fibers containing 2 to less than 80 wt.-% alumina, and
 c) ceramic fibers containing less than 2 wt.-% alumina.

a) Ceramic Fibers 80 wt.-% or More of Alumina:

This first type of ceramic fibers typically contains 80 wt.-% or more of alumina, preferably 85 wt.-% or more of alumina, preferably 90 wt.-% or more of alumina, preferably 95 wt.-% or more of alumina, based on the total weight of the ceramic fibers, wherein the content of alumina is preferably 99 wt.-% or less, more preferably 98 wt.-% or less, even more preferably 97 wt.-% or less, based on the total weight of the ceramic fibers.

The ceramic fibers may further contain 0 to 20 wt.-% of silica, preferably 1 to 20 wt.-% of silica, more preferably 1 to 15 wt.-% of silica, even more preferably 1 to 10 wt.-% of silica, still more preferably 2 to 6 wt.-% of silica, based on the total weight of the ceramic fibers.

It is preferred that these ceramic fibers contain less than 2 wt.-% of components other than silica and alumina, preferably less than 1 wt.-% of components other than silica and alumina, even more preferably less than 0.5 wt.-% of components other than silica and alumina, based on the total weight of the ceramic fibers.

b) Ceramic Fibers Containing 2 to Less than 80 wt.-% Alumina:

This second type of ceramic fibers typically contains 2 to less than 80 wt.-% alumina, preferably 15 to less than 80 wt.-% alumina, more preferably 20 to 75 wt.-% alumina, based on the total weight of the ceramic fibers.

The ceramic fibers may further contain 10 to 98 wt.-% of silica, preferably 15 to 90 wt.-% of silica, more preferably 20 to 85 wt.-% of silica, even more preferably 25 to 80 wt.-% of silica, based on the total weight of the ceramic fibers.

For example, the ceramic fibers may contain 30 to 35 wt.-% of alumina, 50 to 55 wt.-% of silica and a total of $ZrO_2$, $Fe_2O_3$, $TiO_2$, MgO and CaO of 4 to 20 wt.-%, based on the total weight of the ceramic fibers. Alternatively, the ceramic fibers may contain 42 to 48 wt.-% of alumina and 52 to 58 wt.-% of silica, based on the total weight of the ceramic fibers. Furthermore, the ceramic fibers may contain 28 to 32 wt.-% of alumina, 52 to 56 wt.-% of silica and 14 to 18 wt.-% of $ZrO_2$, based on the total weight of the ceramic fibers. Alternatively, the ceramic fibers contain 22 to 34 wt.-% of alumina and 66 to 78 wt.-% of silica, based on the total weight of the ceramic fibers. In a further alternative example, the ceramic fibers contain 66 to 78 wt.-% of alumina, 22 to 34 wt.-% of silica, based on the total weight of the ceramic fibers.

It is preferred that these ceramic fibers contain less than 2 wt.-% of components other than those indicated above, preferably less than 1 wt.-% of components other than those indicated above, even more preferably less than 0.5 wt.-% of components other than those indicated above, based on the total weight of the ceramic fibers.

c) Ceramic Fibers Containing Less than 2 wt.-% Alumina:

Ceramic fibers of this type typically contain less than 2 wt.-% alumina, preferably less than 1 wt.-% alumina, more preferably less than 0.5 wt.-% alumina, based on the total weight of the ceramic fibers. Alumina may even be absent from these ceramic fibers.

These ceramic fibers typically further contain 50 to 85 wt.-% silica and 15 to 50 wt.-% alkaline earth metal oxide, preferably 55 to 85 wt.-% silica and 15 to 45 wt.-% alkaline earth metal oxide, more preferably 60 to 82 wt.-% silica and 18 to 40 wt.-% alkaline earth metal oxide, based on the total weight of the ceramic fibers. Alternatively, ceramic fibers of this type may contain 55 to 72 wt.-% silica and 28 to 45 wt.-% alkaline earth metal oxide, preferably 60 to 70 wt.-% silica and 30 to 40 wt.-% alkaline earth metal oxide, based on the total weight of the ceramic fibers. Another type of these ceramic fibers contains 65 to 85 wt.-% silica and 15 to 35 wt.-% alkaline earth metal oxide, preferably 70 to 80 wt.-% silica and 20 to 30 wt.-% alkaline earth metal oxide, based on the total weight of the ceramic fibers.

The alkaline earth metal oxide is preferably selected from MgO and CaO or a combination thereof, wherein the ratio of the CaO in the alkaline earth metal oxide is preferably 75 wt.-% or more, more preferably 85 wt.-% or more, based on the total amount of alkaline earth metal oxide.

In any of the ceramic fibers described herein, the content of any components of the ceramic fibers other than those indicated is preferably less than 2 wt.-%, more preferably less than 1 wt.-%, still more preferably less than 0.5 wt.-%, based on the total weight of the ceramic fibers.

The Glass Fibers

Several types of glass fibers are known, such as A-glass, C-glass, D-glass, E-glass, M-glass and S-glass. In the present invention, E-glass is preferably used. E- and S-glass fibers usually have a low (MgO+$Al_2O_3$) content, while their content in R-glass fibers is typically least 25 wt.-%.

E-glass typically comprises 50 to 60 wt.-% $SiO_2$, 10 to 18 wt.-% $Al_2O_3$, 0 to 8 wt.-% MgO, 12 to 28 wt.-% CaO, and 2 to 15 wt.-% $B_2O_3$. E-glass preferably comprises 52 to 56 wt.-% $SiO_2$, 12 to 16 wt.-% $Al_2O_3$, 0 to 6 wt.-% MgO, 15 to 25 wt.-% CaO, and 4 to 13 wt.-% $B_2O_3$. Such E-glass may also be referred to as an alumino-borosilicate glass. E-glass may further comprise alkaline oxides, in particular $Na_2O$ and $K_2O$. However, the content of alkaline oxides is typically limited to 3 wt.-% or less, preferably 2 wt.-% or less, more preferably 1 wt.-% less.

The Solvent

The organic solvent used in the method of the present invention is typically a hydrocarbon solvent, preferably selected from $C_{3-16}$ saturated, unsaturated or partially saturated hydrocarbons or mixtures thereof, more preferably selected from $C_{3-10}$ saturated straight, branched or cyclic hydrocarbons or mixtures thereof, even more preferably selected from $C_{3-10}$ linear or branched alkanes or mixtures thereof, still more preferably selected from $C_{5-7}$ linear or branched alkanes or mixtures thereof, still even more preferably selected from hexanes or heptanes or mixtures thereof, most preferably n-hexane.

Alternatively, the organic solvent used in the present invention is an alcohol solvent, preferably selected from $C_{2-12}$ saturated, unsaturated or partially saturated alcohols or mixtures thereof, more preferably selected from $C_{2-12}$ saturated straight, branched or cyclic alcohols or mixtures thereof, even more preferably selected from $C_{2-12}$ saturated straight, branched or cyclic monohydric alcohols or mixtures thereof, still more preferably selected from $C_{2-6}$ saturated straight, branched or cyclic monohydric alcohols (such as ethanol, 1-propanol, 2-propanol, butanols, pentanols (including cyclopentanol) or hexanols (including cyclohexanol)) or mixtures thereof, still even more preferably selected from propanols or mixtures thereof, most preferably 2-propanol.

Furthermore, the organic solvent may be a mixture of one or more hydrocarbon solvent(s) and one or more alcohol solvent(s) indicated above.

The Aerogel

The aerogel may be any inorganic aerogel. Preferably, it comprises or consists of one or more selected from silicon oxide, aluminum oxide, zirconium oxide, titanium oxide, hafnium oxide and yttrium oxide. More preferably, the aerogel comprises or consists of silicon oxide. Even more preferably the aerogel is silica aerogel.

The aerogel typically has a porosity of 85% or higher, more preferably a porosity of 90% or higher, as determined by isotherm adsorption and desorption. More specifically, porosity is determined by measuring pore volume and pore size distribution of aerogel by using the BJH (Barret-Joyner-Halenda) adsorption and desorption isotherm method.

The specific surface area of the aerogel is typically 300 $m^2/g$ or higher. Preferably it is 400 $m^2/g$ or higher, preferably 500 $m^2/g$ or higher, preferably 600 $m^2/g$ or higher, and preferably 2000 $m^2/g$ or less, more preferably 1500 $m^2/g$ or less, even more preferably 1000 $m^2/g$ or less, still more preferably 800 $m^2/g$ or less, as determined by DIN ISO 9277 2003-05 (Determination of the specific surface area of solids by gas adsorption using the BET method).

In the present invention, it is preferable that the powder of the aerogel has a median particle size (d50) in the range of 1 to 50 μm, preferably 5 to 40 urn, more preferably 10 to 30 μm, even more preferably 15 to 25 μm, as measured by laser diffraction, preferably using a Malvern Mastersizer.

The powder of the aerogel may, e.g., be obtained from a heterophase reaction. In such a case, it is preferred that the powder of the aerogel is silica aerogel powder obtained by mixing and reacting de-ionized water, water glass, an organosilane compound, an inorganic acid, and an organic solvent, which is preferably a non-polar organic solvent, to obtain silica hydrogel primary particles. The silica hydrogel primary particles are then solvent-substituted and the solvent-substituted gel particles are dried under ambient pressure to obtain silica aerogel powder. It is preferred that no further grinding or sieving treatment is performed. Such a heterophase reaction method is known to the skilled person and, e.g., described in EP 2 722 311.

The aerogel powder is preferably prepared in the form of particles instead of a monolith. Thus, preferable the aerogel powder used in the present invention has been obtained by a process which does not include grinding of the aerogel material. More preferably, the aerogel powder is in the form of primary particles (optionally including secondary particles). Accordingly, no grinding or sieving treatment is needed for generating the aerogel powder. Furthermore, it is preferred that the aerogel powder is dried under ambient pressure, e.g. 1 atm, instead of using a supercritical drying process which is sometimes employed in the production of aerogel according to the prior art.

The Aerogel Composition

The aerogel composition comprises the aerogel powder, graphite and the organic solvent. It is to be understood that the aerogel composition may contain further components. To achieve efficient distribution of the aerogel powder in the fibrous article, the aerogel composition is preferably a dispersion of the aerogel powder and the graphite in the organic solvent.

The aerogel composition typically contains 2 to 20 wt.-% aerogel, preferably 4 to 18 wt.-% aerogel, more preferably 6 to 18 wt.-% aerogel, even more preferably 10 to 18 wt.-% aerogel, based on the total weight of the aerogel composition. The remainder is preferably the graphite and the organic solvent.

It is preferred that the combined content of aerogel powder and organic solvent in the aerogel composition is 90 wt.-% or more, preferably 95 wt.-% or more, more preferably 97 wt.-% or more, even more preferably 98 wt.-% or more, still more preferably 99 wt.-% or more, most preferably 99.5 wt.-% or more, or even 99.8 wt.-% or more, based on the total weight of the aerogel composition.

Alternatively, if the method involves the use of inorganic opacifiers and/or mineral fillers, the aerogel composition is preferably a dispersion of the aerogel powder, inorganic opacifiers and/or mineral fillers in the organic solvent. In particular, if the method involves the use of inorganic opacifiers and/or mineral fillers, the aerogel composition is preferably a dispersion of the aerogel powder, graphite, and other inorganic opacifiers and/or mineral fillers in the organic solvent. Other components may or may not be contained in the aerogel composition.

The inorganic opacifiers typically comprise or consist of one or more selected from iron oxide, zirconium oxide, titanium oxide, silicon carbide and graphite (graphite preferably being contained in the composite article in an amount of less than 5 wt. %, preferably less than 2 wt. %, more preferably less than 1 wt. % based on the total weight of the composite article). Among these, iron oxide, zirconium oxide, titanium oxide and/or silicon carbide are preferred. Preferably the inorganic opacifiers comprise or consist of one or more selected from iron oxide, zirconium oxide and silicon carbide, more preferably wherein the inorganic opacifier is iron oxide or silicon carbide.

Further examples of inorganic opacifiers are manganese ferrite, tin oxide, titanium carbide, and tungsten carbide. The content of inorganic opacifiers is typically 35 wt.-% or less, preferably 20 wt.-% or less, more preferably 15 wt.-% or less, even more preferably 10 wt.-% or less, based on the total weight of the composite article. The content of inorganic opacifiers is typically 0.1 wt.-% or more, preferably 0.5 wt.-% or more, more preferably 1 wt.-% or more, even more preferably 2 wt.-% or more, based on the total weight of the composite article. As the skilled person understands, this may be achieved by adjusting the content of the inorganic opacifiers in the aerogel composition accordingly.

In the present invention graphite is contained as an inorganic opacifier in the composite article. Accordingly, graphite is considered inorganic as it is an allotrope of carbon. The content of graphite is typically 35 wt.-% or less, preferably 20 wt.-% or less, more preferably 15 wt.-% or less, even more preferably 10 wt.-% or less, based on the total weight of the composite article. The content of graphite is typically 0.1 wt.-% or more, preferably 0.5 wt.-% or more, more preferably 1 wt.-% or more, even more preferably 2 wt.-% or more, based on the total weight of the composite article. Graphite may be used as sole opacifier or in combination with other opacifiers such as disclosed herein. Preferably graphite is used in combination with manganese-ferrite. The weight ratio of graphite to manganese-ferrite is preferably 9:1 to 1:9, more preferably 8:1 to 1:8, even more preferably 7:1 to 1:7, still more preferably 6:1 to 1:6, even still more preferably 5:1 to 1:5, 4:1 to 1:4, or even 3:1 to 1:3. Even more preferably, the weight ratio of graphite to manganese-ferrite is 2:1 to 1:2, most preferably about 1:1. The combination of graphite with manganese-ferrite has been found to lead to a significant decrease of thermal conductivity, in particular above 200° C., when compared with the use of only manganese-ferrite as opacifier, as shown in Example 3 of the experimental part. Moreover, all thermal conductivities, at a temperature lower or equal than at 400° C., are lower than when using only graphite as opacifier. Accordingly, it is believed that a synergistic effect is achieved by the combination of graphite with manganese-ferrite. The combined content of graphite and manganese-ferrite is typically 35 wt.-% or less, preferably 20 wt.-% or less, more preferably 15 wt.-% or less, even more preferably 10 wt.-% or less, based on the total weight of the composite article. The combined content of graphite and manganese-ferrite is typically 0.1 wt.-% or more, preferably 0.5 wt.-% or more, more preferably 1 wt.-% or more, even more preferably 2 wt.-% or more, based on the total weight of the composite article.

Manganese-ferrite has the chemical formula $(Mn,Fe)_2O_3$. Accordingly, manganese-ferrite contains both Mn and Fe. Preferably, the ratio of Mn to Fe in manganese-ferrite is in the range of from 9:1 to 1:9. Manganese-ferrite is believed to belong to the class of ferrospinel.

The graphite can be any natural or synthetic graphite. It is preferably natural graphite, more preferably natural crystalline graphite, even more preferably natural macrocrystalline graphite. The graphite preferably has a particle size ($D_{50}$) within a range of from 1 to 100 μm, preferably from 2 to 50 μm, more preferably from 3 to 30 μm, even more preferably from 4 to 20 μm, as measured by laser diffraction, preferably using a Malvern Mastersizer.

The mineral fillers preferably comprise or consist of one or more selected from metal hydroxides and hydrated carbonates. Preferably, the mineral fillers comprise or consist of one or more selected from aluminum hydroxides, magnesium hydroxides, hydromagnesites and hydrocalcites. More preferably, the mineral fillers are one or both selected from magnesium dihydroxide and aluminum trihydroxide. Even more preferably, magnesium dihydroxide is used as a mineral filler. Mineral fillers, such as magnesium dihydroxide, are preferably included in the composite article in an amount of 0.1 to 10 wt-% (more preferably 0.1 to 5 wt-%, 0.2 to 3 wt-% or even 0.5 to 2 wt-%), based on the total weight of the composite article.

It is preferred that the inorganic opacifiers and the mineral fillers are not in the form of aerogel(s). It is in particular preferred that the bulk density of the inorganic opacifiers, and more preferably also of the mineral fillers, is at least 0.1 g/cm$^3$, tested according to DIN EN ISO 787-11 and/or that the specific surface area of the inorganic opacifiers, and more preferably also of the mineral fillers, is 300 m$^2$/g or less, tested according to DIN ISO 9277 2003-05 (BET method). Alternatively or in addition, is furthermore preferred that the inorganic opacifiers, and more preferably also the mineral fillers, are chemically different from the material used as the aerogel. It is to be understood that any combination of the inorganic opacifiers, and of the mineral fillers, mentioned herein may be used.

In the case of containing inorganic opacifiers and/or mineral fillers, the aerogel composition preferably contains 2 to 20 wt.-% aerogel, preferably 4 to 18 wt.-% aerogel, more preferably 6 to 18 wt.-% aerogel, even more preferably 10 to 18 wt.-% aerogel, based on the total weight of the aerogel composition, the remainder preferably being organic solvent and inorganic opacifiers and mineral fillers.

In the case of containing inorganic opacifiers and/or mineral fillers, the combined content of aerogel powder and organic solvent in the aerogel composition is typically 50 wt.-% or more, preferably 75 wt.-% or more, more preferably 85 wt.-% or more. Furthermore, the combined content of inorganic opacifiers and mineral fillers in the aerogel composition is typically 50 wt.-% or less, preferably 25 wt.-% or less, more preferably 15 wt.-% or less, based on the total weight of the aerogel composition.

The Composite Article Obtainable by the Method

The present invention furthermore relates to a composite article obtainable by the method according to the present invention. It is to be understood that this composite article exhibits the properties resulting from the method of the present invention. Accordingly, any of the features set out herein with respect to the method of the invention, including any preferred ranges, also apply with respect to the composite article of the present invention.

For example, the composite article preferably contains 15 to 70 wt.-% aerogel based on the total weight of the composite article. The thickness of the composite article is preferably in the range of 3 mm to 500 mm.

It is to be understood that any known fillers may be contained in the composite article of the present invention without any particular limitation. However, the composite article contains preferably less than 15% by weight organic compounds and preferably less than 10% by weight binder. The composite article preferably exhibits a total weight loss, in thermogravimetric analysis (TGA) when being heated in a nitrogen atmosphere from 30° C. to 1100° C. with temperature ramp of 10° C./min, of less than 35% by weight.

Preferably at least 50% of the fibers in the composite article have a length of 5 mm or more. It is furthermore preferred that the weight ratio of the one or more aerogels to the one or more fibers (aerogel/fiber) in the composite article is 1:8 or higher. As will be understood, the composite article may further comprise inorganic opacifiers and/or mineral fillers as specified herein.

The composite article may be defined in further ways, either by referring to its method of production or to its properties.

Accordingly, the composite article of the present invention may be defined as comprising aerogel particles, graphite and ceramic and/or glass fibers, wherein the composite article is obtainable by injecting, or impregnating, or soaking an aerogel composition comprising an aerogel powder, graphite and an organic solvent, and optionally inorganic opacifiers and/or mineral fillers, into a fibrous article comprising ceramic and/or glass fibers, and partially or completely removing the organic solvent to obtain the composite article.

In the present invention, it is to be understood that, among "injecting, or impregnating, or soaking", "injecting" is preferred.

In addition or alternatively, the composite article may be defined as comprising aerogel particles, graphite (as sole opacifier or in combination with other opacifier(s) such as disclosed herein) and ceramic and/or glass fibers, wherein one or more of the following requirements (i) to (vii) are fulfilled:

(i) The composite article contains less than 15% by weight organic compounds, based on the total weight of the composite article. The content of organic compounds is preferably less than 10% by weight, more preferably less than 2% by weight, even more preferably less than 5% by weight. The term organic compound relates to any compounds containing at least one carbon-hydrogen bond.

(ii) At least 50% of the fibers in the composite article have a length of 5 mm or more. Preferably at least 50% of the fibers in the composite article have a length of 10 mm or more. More preferably at least 75% of the fibers in the composite article have a length of 5 mm or more. Even more preferably at least 75% of the fibers in the composite article have a length of 10 mm or more. Still more preferably at least 75% of the fibers in the composite article have a length of 15 mm or more. Most preferably at least 75% of the fibers in the composite article have a length of 20 mm or more.)

(iii) The composite article contains less than 10% by weight binder, based on the total weight of the composite article. The content of binder in the composite article contains less than 10% by weight binder, preferably less than 5% by weight binder, more preferably less than 2% by weight binder, even more preferably less than 1% by weight binder, still more preferably less than 0.5% by weight binder, most preferably less than 0.1% by weight binder.

(iv) The composite article exhibits a total weight loss in thermogravimetric analysis (TGA) when being heated in a nitrogen atmosphere from 30° C. to 1100° C. with a temperature increase of 10° C./min of less than 35% by weight. The total weight loss in thermogravimetric analysis is preferably less than 30% by weight, more preferably less than 25% by weight, even more preferably less than 20% by weight, still more preferably less than 15% by weight, most preferably less than 10% by weight, based on the weight of the composite article before the thermogravimetric analysis.

(v) The weight ratio of the one or more aerogels to the one or more fibers (aerogel/fiber) in the composite article is 1:8 or higher. Preferably, the weight ratio of the one or more aerogels to the one or more fibers (aerogel/fiber) in the composite article is higher than 1:8, preferably 1:4 or higher, more preferably 1:2 or higher, even more preferably 1:1 or higher.

(vi) The composite article has a burn-through time of 60 minutes or more. Preferably, the composite article has a burn-through time of 60 minutes or more, preferably 120 minutes or more, even more preferably 180 minutes of more, still more preferably 240 minutes or more. The burn-through resistance is determined using the composite article in the form of a 30 cm×30 cm sheet with a thickness of 13 mm and treating the composite article at the centre of its first major surface with a flame having a temperature of 1400° C., using a soldering torch, wherein the burn-through time is the duration from start of the flame treatment until the centre of the second major surface reaches a temperature of 1000° C.

(vii) When using the composite article in the form of a 20 cm×50 cm sheet with a thickness of 13 mm and treating the composite article at the full surface of its first major surface in accordance with the ISO 834 temperature-time curve (ISO 834-8:2002 test with $T=T_0+345 \log 10 (8t+1)$; wherein $T_0$ is 20° C.) for 180 minutes, the centre of the second major surface has a temperature of less than 1000° C. Preferably, the centre of the second major surface has a temperature of less than 900° C., preferably less than 800° C., more preferably less than 700° C., even more preferably less than 600° C., still more preferably less than 500° C.

In the case of the composite article containing the glass fibers, features (vi) and (vii) are preferably not applicable.

The composite article may fulfil one or any number of possible combinations of requirements (i) to (vii). For example, the composite article preferably fulfils requirement (i), or requirement (ii), or requirement (iii), or requirement (iv), or requirement (v), or requirement (vi), or requirement (vii). Alternatively, it is preferred that two requirements be fulfilled, such as (i) and (ii), (ii) and (iii), (iii) and (iv), (iv) and (v), (v) and (vi), (vi) and (vii), (i) and (iii), (ii) and (iv), (iii) and (v), (iv) and (vi), (v) and (vii), (i) and (iv), (ii) and (v), (iii) and (vi), (iv) and (vii), (i) and (v), (ii) and (vi), (iii) and (vii), (i) and (vi), (ii) and (vii), or (i) and (vii). Alternatively, it is preferred that three requirements be fulfilled, such as (i) and (ii) and (iii), (i) and (ii) and (iv), (i) and (ii) and (v), (i) and (ii) and (vi), (i) and (ii) and (vii), (i) and (iii) and (iv), (i) and (iii) and (v), (i) and (iii) and (vi), (i) and (iii) and (vii), (i) and (iv) and (v), (i) and (iv) and (vi), (i) and (iv) and (vii), (i) and (v) and (vi), (i) and (v) and (vii), (i) and (vi) and (vii), (ii) and (iii) and (iv), (ii) and (iii) and (v), (ii) and (iii) and (vi), (ii) and (iii) and (vii), (ii) and (iv) and (v), (ii) and (iv) and (vi), (ii) and (iv) and (vii), (ii) and (v) and (vi), (ii) and (v) and (vii), (ii) and (vi) and (vii), (iii) and (iv) and (v), (iii) and (iv) and (vi), (iii) and (iv) and (vii), (iii) and (v) and (vi), (iii) and (v) and (vii), (iii) and (vi) and (vii), (iv) and (v) and (vi), (iv) and (v) and (vii), (iv) and (vi) and (vii), or (v) and (vi) and (vii). Alternatively, it is preferred that four, five or six of these requirements be fulfilled.

It is to be understood that also the composite article according to these alternative definitions may further comprise inorganic opacifiers and/or mineral fillers. In particular, the composite article of the present invention contains graphite as an opacifier. The composite article preferably contains 15 to 70 wt.-%, more preferably 25 to 60 wt %, still more preferably 35 to 50 wt % aerogel, based on the total weight of the composite article. Preferably, the composite article has a thickness in the range of 3 mm to 500 mm, more preferably in the range of 3 to 100 mm, still more preferably in the range of 3 to 50 mm, still even more preferably in the range of 5 to 30 mm. In addition, when the width of the composite article is W, the length of the composite article is L and the thickness of the composite article is T, the following requirement is preferably fulfilled:

$$R = \frac{W \times L}{T^2}$$

wherein R is 100 or more, preferably 1000 or more, more preferably 10000 or more,
wherein W/L is preferably in a range of 1000/1 to 1/1000,
wherein W/T is preferably 10 or more, and
wherein L/T is preferably 10 or more.

It is to be understood that the composite article of the present invention may contain further components, such as inert fillers or pigments, flame retardants, flame and smoke suppressors, binders. These are preferably added by including them in the aerogel composition.

The composite article of the present invention may furthermore be coated with various other materials and/or combined with other materials, such as wovens or laminates, to form further composites.

It is contemplated that the graphite and other opacifiers and/or fillers may, instead of or in addition to being in the aerogel composition, be injected (preferably in the form of a composition comprising the graphite and an organic solvent as described herein) into the fibrous article before or after the aerogel composition is/has been injected into the fibrous article. However, it is preferred that the graphite be present in the aerogel composition such that it is introduced into the fibrous article together with the other components of the aerogel composition.

Furthermore, the graphite opacifier or the opacifier comprising graphite and manganese-ferrite may also be used in composite articles comprising aerogel particles and ceramic and/or glass fibers in general. Thus, the present invention may also relate to (a) a composite article comprising aerogel particles, graphite and ceramic and/or glass fibers (preferably without further limitations);
(b) use of graphite as an opacifier in a composite article comprising aerogel particles and ceramic and/or glass fibers;
(c) use of graphite in combination with manganese-ferrite as an opacifier in a composite article comprising aerogel particles and ceramic and/or glass fibers.

In each of (a) to (c) the preferred definitions of the terms, materials, compositions, further components, ratios, etc. described in the present application are also preferably applicable. Thus, for example, the ratios of graphite to manganese-ferrite disclose in the present application (such as 9:1 to 1:9, or about 1:1) are also preferable in the use of (c) above.

The present invention may be summarized by the following items 1 to 71:

1. A method for the preparation of a composite article comprising aerogel particles, graphite and ceramic and/or glass fibers, the method comprising:
    providing a fibrous article comprising ceramic and/or glass fibers,
    providing an aerogel composition comprising an aerogel powder, graphite and an organic solvent,
    combining the fibrous article and the aerogel composition, and
    partially or completely removing the organic solvent to obtain the composite article.
2. The method for the preparation of a composite article according to item 1, wherein the composite article further comprises inorganic opacifiers and/or mineral fillers, wherein the step of providing an aerogel composition comprising an aerogel powder, graphite and an organic solvent, is a step of providing an aerogel composition comprising an aerogel powder, graphite and an organic solvent and inorganic opacifiers and/or mineral fillers.
3. The method for the preparation of a composite article according to item 1 or 2, wherein the fibrous article is selected from batting, nonwovens, mats, felts and needled fiber blankets, wherein the fibrous article is preferably a nonwoven fiber blanket or a needled fiber blanket.
4. The method for the preparation of a composite article according to any one of items 1 to 3, wherein the fibrous article has a density of 20 to 300 kg/m$^3$, preferably 50 to 200 kg/m$^3$, more preferably 80 to 150 kg/m$^3$.
5. The method for the preparation of a composite article according to any one of the preceding items, wherein the ceramic fibers contain 80 wt.-% or more of alumina, preferably 85 wt.-% or more of alumina, preferably 90 wt.-% or more of alumina, preferably 95 wt.-% or more of alumina, based on the total weight of the ceramic fibers, wherein the content of alumina is preferably 99 wt.-% or less, more preferably 98 wt.-% or less, even more preferably 97 wt.-% or more, based on the total weight of the ceramic fibers.
6. The method for the preparation of a composite article according to item 5, wherein the ceramic fibers further contain 0 to 20 wt.-% of silica, preferably 1 to 20 wt.-% of silica, more preferably 1 to 15 wt.-% of silica, even more preferably 1 to 10 wt.-% of silica, still more preferably 2 to 6 wt.-% of silica, based on the total weight of the ceramic fibers.
7. The method for the preparation of a composite article according to item 5, wherein the ceramic fibers contain less than 2 wt.-% of components other than silica and alumina, preferably less than 1 wt.-% of components other than silica and alumina, even more preferably less than 0.5 wt.-% of components other than silica and alumina, based on the total weight of the ceramic fibers.
8. The method for the preparation of a composite article according to any one of items 1 to 4, wherein the ceramic fibers contain 2 to less than 80 wt.-% alumina, preferably 15 to less than 80 wt.-% alumina, more preferably 20 to 75 wt.-% alumina, based on the total weight of the ceramic fibers.
9. The method for the preparation of a composite article according to item 8, wherein the ceramic fibers further contain 10 to 98 wt.-% of silica, preferably 15 to 90 wt.-% of silica, more preferably 20 to 85 wt.-% of silica, even more preferably 25 to 80 wt.-% of silica, based on the total weight of the ceramic fibers.
10. The method for the preparation of a composite article according to item 8 or 9, wherein the ceramic fibers contain 30 to 35 wt.-% of alumina, 50 to 55 wt.-% of silica and a total of $ZrO_2$, $Fe_2O_3$, $TiO_2$, MgO and CaO of 4 to 20 wt.-%, based on the total weight of the ceramic fibers.
11. The method for the preparation of a composite article according to item 8 or 9, wherein the ceramic fibers contain 42 to 48 wt.-% of alumina and 52 to 58 wt.-% of silica, based on the total weight of the ceramic fibers.
12. The method for the preparation of a composite article according to item 8 or 9, wherein the ceramic fibers contain 28 to 32 wt.-% of alumina, 52 to 56 wt.-% of silica and 14 to 18 wt.-% of $ZrO_2$, based on the total weight of the ceramic fibers.
13. The method for the preparation of a composite article according to item 8 or 9, wherein the ceramic fibers contain 22 to 34 wt.-% of alumina, 66 to 78 wt.-% of silica, based on the total weight of the ceramic fibers.
14. The method for the preparation of a composite article according to item 8 or 9, wherein the ceramic fibers contain 66 to 78 wt.-% of alumina, 22 to 34 wt.-% of silica, based on the total weight of the ceramic fibers.
15. The method for the preparation of a composite article according to any one of items 1 to 4, wherein the ceramic fibers contain less than 2 wt.-% alumina, preferably less than 1 wt.-% alumina, more preferably less than 0.5 wt.-% alumina, based on the total weight of the ceramic fibers.
16. The method for the preparation of a composite article according to item 15, wherein the ceramic fibers further contain 50 to 85 wt.-% silica and 15 to 50 wt.-% alkaline earth metal oxide, preferably 55 to 85 wt.-% silica and 15 to 45 wt.-% alkaline earth metal oxide, more preferably 60 to 82 wt.-% silica and 18 to 40 wt.-% alkaline earth metal oxide, based on the total weight of the ceramic fibers.
17. The method for the preparation of a composite article according to item 15, wherein the ceramic fibers further contain 55 to 72 wt.-% silica and 28 to 45 wt.-% alkaline earth metal oxide, preferably 60 to 70 wt.-% silica and 30 to 40 wt.-% alkaline earth metal oxide, based on the total weight of the ceramic fibers.
18. The method for the preparation of a composite article according to item 15, wherein the ceramic fibers further contain 65 to 85 wt.-% silica and 15 to 35 wt.-% alkaline earth metal oxide, preferably 70 to 80 wt.-% silica and 20 to 30 wt.-% alkaline earth metal oxide, based on the total weight of the ceramic fibers.
19. The method for the preparation of a composite article according to any one of items 16 to 18, wherein the alkaline earth metal oxide is selected from MgO and CaO or a combination thereof, wherein the content of the CaO in the alkaline earth metal oxide is preferably 75 wt.-% or more, more preferably 85 wt.-% or more, based on the total amount of alkaline earth metal oxide.
20. The method for the preparation of a composite article according to any one of items 8 to 14 and 16 to 19, wherein the content of any components of the ceramic fibers other than those indicated in the respective items is less than 2 wt.-%, preferably less than 1 wt.-%, even more preferably less than 0.5 wt.-%, based on the total weight of the ceramic fibers.
21. The method for the preparation of a composite article according to any one of items 1 to 20, wherein the glass fibers comprise 50 to 60 wt.-% $SiO_2$, 10 to 18 wt.-% $Al_2O_3$, 0 to 8 wt.-% MgO, 12 to 28 wt.-% CaO, 2 to 15 wt.-% $B_2O_3$ and 0 to 3 wt % of a total of alkali metal oxides, preferably 52 to 56 wt.-% $SiO_2$, 12 to 16 wt.-% $Al_2O_3$, 0 to 6 wt.-% MgO, 15 to 25 wt.-% CaO, 4 to 13 wt.-% $B_2O_3$ and 0 to 3 wt % of a total of alkali metal oxides.
22. The method for the preparation of a composite article according to any one of items 1 to 21, wherein 50 wt.-% or more, preferably 60 wt.-%, more preferably 70 wt.-%, even more preferably 80 wt.-%, still preferably 90 wt.-% or more, even still more preferably 95 wt.-% or more, or even more 98 wt.-% or more, or even more preferably all of the fibers are ceramic fibers.
23. The method for the preparation of a composite article according to any one of items 1 to 22, wherein 50 wt.-% or more, preferably 60 wt.-%, more preferably 70 wt.-%, even more preferably 80 wt.-%, still preferably 90 wt.-% or more, even still more preferably 95 wt.-% or more, or even more 98 wt.-% or more, or even more preferably all of the fibers are glass fibers.

24. The method for the preparation of a composite article according to any one of items 1 to 23, wherein the ceramic and/or glass fibers contain ceramic fibers and optionally glass fibers; preferably at least 50 wt.-% of the ceramic and/or glass fibers are ceramic fibers, with the remainder being glass fibers.

25. The method for the preparation of a composite article according to any one of items 1 to 24, wherein the content of graphite is 35 wt.-% or less, preferably 20 wt.-% or less, more preferably 15 wt.-% or less, even more preferably 10 wt.-% or less, based on the total weight of the composite article.

26. The method for the preparation of a composite article according to any one of items 1 to 25, wherein the content of graphite is 0.1 wt.-% or more, preferably 0.5 wt.-% or more, more preferably 1 wt.-% or more, even more preferably 2 wt.-% or more, based on the total weight of the composite article.

27. The method for the preparation of a composite article according to any one of items 1 to 26, wherein the composite article furthermore contains manganese-ferrite, wherein the weight ratio of graphite to manganese-ferrite is preferably 9:1 to 1:9, more preferably 8:1 to 1:8, even more preferably 7:1 to 1:7, still more preferably 6:1 to 1:6, even still more preferably 5:1 to 1:5, 4:1 to 1:4, or even 3:1 to 1:3.

28. The method for the preparation of a composite article according to item 27, wherein the combined content of graphite and manganese-ferrite is 35 wt.-% or less, preferably 20 wt.-% or less, more preferably 15 wt.-% or less, even more preferably 10 wt.-% or less, based on the total weight of the composite article.

29. The method for the preparation of a composite article according to item 27 or 28, wherein the combined content of graphite and manganese-ferrite is 0.1 wt.-% or more, preferably 0.5 wt.-% or more, more preferably 1 wt.-% or more, even more preferably 2 wt.-% or more, based on the total weight of the composite article.

30. The method for the preparation of a composite article according to any one of items 1 to 29, wherein the opacifiers in the composite article consist of graphite and optionally manganese-ferrite.

31. The method for the preparation of a composite article according to any one of the preceding items, wherein the organic solvent is a hydrocarbon solvent, preferably selected from $C_{3-16}$ saturated, unsaturated or partially saturated hydrocarbons or mixtures thereof, more preferably selected from $C_{3-10}$ saturated straight, branched or cyclic hydrocarbons or mixtures thereof, even more preferably selected from $C_{3-10}$ linear or branched alkanes or mixtures thereof, still more preferably selected from $C_{5-7}$ linear or branched alkanes or mixtures thereof, still even more preferably selected from hexanes or heptanes or mixtures thereof, most preferably n-hexane.

32. The method for the preparation of a composite article according to any one of items 1 to 30, wherein the organic solvent is an alcohol solvent, preferably selected from $C_{2-12}$ saturated, unsaturated or partially saturated alcohols or mixtures thereof, more preferably selected from $C_{2-12}$ saturated straight, branched or cyclic alcohols or mixtures thereof, even more preferably selected from $C_{2-12}$ saturated straight, branched or cyclic monohydric alcohols or mixtures thereof, still more preferably selected from $C_{2-6}$ saturated straight, branched or cyclic monohydric alcohols or mixtures thereof, still even more preferably selected from propanols or mixtures thereof, most preferably 2-propanol.

33. The method for the preparation of a composite article according to any one of the preceding items, wherein the aerogel comprises or consists of one or more selected from silicon oxide, aluminum oxide, zirconium oxide, titanium oxide, hafnium oxide and yttrium oxide, preferably wherein the aerogel comprises or consists of silicon oxide, more preferably wherein the aerogel is silica aerogel.

34. The method for the preparation of a composite article according to any one of the preceding items, wherein the aerogel has a porosity of 85% or higher, more preferably a porosity of 90% or higher, as determined by isotherm adsorption and desorption.

35. The method for the preparation of a composite article according to any one of the preceding items, wherein the aerogel has a specific surface area of 300 $m^2/g$ or higher, preferably 400 $m^2/g$ or higher, preferably 500 $m^2/g$ or higher, preferably 600 $m^2/g$ or higher, and preferably 2000 $m^2/g$ or less, more preferably 1500 $m^2/g$ or less, even more preferably 1000 $m^2/g$ or less, as determined by DIN ISO 9277 2003-05 (Determination of the specific surface area of solids by gas adsorption using the BET method).

36. The method for the preparation of a composite article according to any one of the preceding items, wherein the powder of the aerogel has a median particle size (d50) in the range of 1 to 50 μm, preferably 5 to 40 μm, more preferably 10 to 30 μm, even more preferably 15 to 25 μm, as measured by laser diffraction, preferably using a Malvern Mastersizer.

37. The method for the preparation of a composite article according to any one of the preceding items, wherein the powder of the aerogel is obtained from a heterophase reaction.

38. The method for the preparation of a composite article according to any one of the preceding items, wherein the powder of the aerogel is silica aerogel powder obtained by mixing and reacting de-ionized water, water glass, an organosilane compound, an inorganic acid, and an organic solvent, which is preferably a non-polar organic solvent, to obtain silica hydrogel primary particles, solvent-substituting the silica hydrogel primary particles, and drying the solvent-substitution completed gel particles under ambient pressure to obtain silica aerogel powder, preferably without any further grinding or sieving treatment.

39. The method for the preparation of a composite article according to item 1 or any one of items 3 to 38, wherein the aerogel composition is a dispersion of the aerogel powder in the organic solvent which further comprises graphite.

40. The method for the preparation of a composite article according to item 1 and any one of items 3 to 39, wherein the aerogel composition contains 2 to 20 wt.-% aerogel, preferably 4 to 18 wt.-% aerogel, more preferably 6 to 18 wt.-% aerogel, even more preferably 10 to 18 wt.-% aerogel, based on the total weight of the aerogel composition, the remainder preferably being organic solvent.

41. The method for the preparation of a composite article according to item 1 and any of items 3 to 40, wherein the combined content of aerogel powder and organic solvent in the aerogel composition is 90 wt.-% or more, preferably 95 wt.-% or more, more preferably 97 wt.-% or more, even more preferably 98 wt.-% or more, still more preferably 99 wt.-% or more, most preferably 99.5 wt.-% or more, or even 99.8 wt.-% or more.

42. The method for the preparation of a composite article according to any one of items 2 to 38, wherein the aerogel composition is a dispersion of the aerogel powder, graphite, and optionally other inorganic opacifiers and/or mineral fillers in the organic solvent.

43. The method for the preparation of a composite article according to any one of items 2 to 38 and 42, wherein the inorganic opacifiers comprise or consist of one or more selected from iron oxide, zirconium oxide, and silicon carbide, preferably wherein the inorganic opacifier is iron oxide or silicon carbide.

44. The method for the preparation of a composite article according to any one of items 2 to 38, 42 and 43, wherein the mineral fillers comprise or consist of one or more selected from metal hydroxides and hydrated carbonates, preferably wherein the mineral fillers comprise or consist of one or more selected from aluminum hydroxides, magnesium hydroxides, hydromagnesites and hydrocalcites, more preferably wherein the mineral fillers are one or both selected from magnesium dihydroxide and aluminum trihydroxide.

45. The method for the preparation of a composite article according to any one of items 2 to 38 and 42 to 44, wherein the aerogel composition contains 2 to 20 wt.-% aerogel, preferably 4 to 18 wt.-% aerogel, more preferably 6 to 18 wt.-% aerogel, even more preferably 10 to 18 wt.-% aerogel, based on the total weight of the aerogel composition, the remainder preferably being organic solvent, graphite and other inorganic opacifiers and mineral fillers.

46. The method for the preparation of a composite article according to any one of items 2 to 38 and 42 to 45, wherein the combined content of aerogel powder and organic solvent in the aerogel composition is 50 wt.-% or more, preferably 75 wt.-% or more, more preferably 85 wt.-% or more.

47. The method for the preparation of a composite article according to any one of items 2 to 38 and 42 to 46, wherein the combined content of inorganic opacifiers and mineral fillers in the aerogel composition is 50 wt.-% or less, preferably 25 wt.-% or less, more preferably 15 wt.-% or less.

48. The method for the preparation of a composite article according to any one of the preceding items, wherein the fibrous article and the aerogel composition are combined by injecting, or impregnating, or soaking the aerogel composition into the fibrous article.

49. The method for the preparation of a composite article according to any one of the preceding items wherein partially or completely removing the organic solvent to obtain the composite article by drying includes drying at a temperature of 50 to 170° C. for 1 to 8 hours, optionally followed by drying at 171° C. to 230° C. for 1 to 48 hours.

50. The method for the preparation of a composite article according to any one of the preceding items, wherein the composite article contains 15 to 70 wt.-%, preferably 25 to 60 wt %, more preferably 35 to 50 wt %, aerogel, based on the total weight of the composite article.

51. The method for the preparation of a composite article according to any one of the preceding items, wherein the composite article has a thickness in the range of 3 mm to 500 mm, preferably in the range of 3 to 100 mm, more preferably in the range of 3 to 50 mm, even more preferably in the range of 5 to 30 mm.

52. The method for the preparation of a composite article according to any one of the preceding items, wherein when the width of the composite article is W, the length of the composite article is L and the thickness of the composite article is T, the following requirement is fulfilled:

$$R = \frac{W \times L}{T^2}$$

wherein R is 100 or more, preferably 1000 or more, more preferably 10000 or more,
wherein W/L is preferably in a range of 1000/1 to 1/1000,
wherein W/T is preferably 10 or more, and
wherein L/T is preferably 10 or more.

53. The method for the preparation of a composite article according to any one of the preceding items, wherein the composite article contains less than 15% by weight organic compounds, preferably less than 10% by weight organic compounds, more preferably less than 5% by weight organic compounds, wherein the term organic compound relates to any compounds containing at least one carbon-hydrogen bond.

54. The method for the preparation of a composite article according to any one of the preceding items, wherein at least 50% of the fibers in the composite article have a length of 5 mm or more, preferably wherein at least 50% of the fibers in the composite article have a length of 10 mm or more, more preferably wherein at least 75% of the fibers in the composite article have a length of 5 mm or more, even more preferably wherein at least 75% of the fibers in the composite article have a length of 10 mm or more, still more preferably wherein at least 75% of the fibers in the composite article have a length of 15 mm or more, most preferably wherein at least 75% of the fibers in the composite article have a length of 20 mm or more.

55. The method for the preparation of a composite article according to any one of the preceding items, wherein the composite article contains less than 10% by weight binder, preferably less than 5% by weight binder, more preferably less than 2% by weight binder, even more preferably less than 1% by weight binder, still more preferably less than 0.5% by weight binder, most preferably less than 0.1% by weight binder.

56. The method for the preparation of a composite article according to any one of the preceding items, wherein the composite article exhibits a total weight loss, in thermogravimetric analysis (TGA) when being heated in a nitrogen atmosphere from 30° C. to 1100° C. with temperature ramp of 10° C./min, of less than 35% by weight, preferably less than 30% by weight, more preferably less than 25% by weight, even more preferably less than 20% by weight, still more preferably less than 15% by weight, most preferably less than 10% by weight.

57. The method for the preparation of a composite article according to any one of the preceding items, wherein the weight ratio of the one or more aerogels to the one or more fibers (aerogel/fiber) in the composite article is 1:8 or higher, preferably 1:4 or higher, more preferably 1:2 or higher, even more preferably 1:1 or higher.

58. A composite article obtainable by the method according to any one of the preceding items.

59. A composite article comprising aerogel particles, graphite and ceramic and/or glass fibers, wherein the composite article is obtainable by injecting, or impregnating, or soaking an aerogel composition comprising an aerogel powder, graphite and an organic solvent, and optionally inorganic opacifiers and/or mineral fillers, into a fibrous article comprising ceramic and/or glass fibers, and partially or completely removing the organic solvent to obtain the composite article.

60. A composite article comprising aerogel particles, graphite and ceramic and/or glass fibers, wherein one or more of the following requirements (i) to (vii) are fulfilled:
(i) the composite article contains less than 15% by weight organic compounds;
(ii) at least 50% of the fibers in the composite article have a length of 5 mm or more;
(iii) the composite article contains less than 10% by weight binder;
(iv) the composite article exhibits a total weight loss in thermogravimetric analysis (TGA) when being heated in a nitrogen atmosphere from 30° C. to 1100° C. with a temperature increase of 10° C./min of less than 35% by weight;
(v) the weight ratio of the one or more aerogels to the one or more fibers (aerogel/fiber) in the composite article is 1:8 or higher;
(vi) the composite article has a burn-through time of 60 minutes or more, wherein the burn-through resistance is determined using the composite article in the form of a 30 cm×30 cm sheet with a thickness of 13 mm and treating the composite article at the centre of its first major surface with a flame having a temperature of 1400° C., using a soldering torch, wherein the burn-through time is the duration from start of the flame treatment until the centre of the second major surface reaches a temperature of 1000° C.;
(vii) when using the composite article in the form of a 20 cm×50 cm sheet with a thickness of 13 mm and treating the composite article at the full surface of its first major surface in accordance with the ISO 834 temperature-time curve for 180 minutes, the centre of the second major surface has a temperature of less than 1000° C.

61. The composite article according to item 60, further comprising inorganic opacifiers and/or mineral fillers.

62. The composite article according to item 60 or 61, wherein the composite article contains less than 15% by weight organic compounds, preferably less than 10% by weight organic compounds, more preferably less than 5% by weight organic compounds, wherein the term organic compound relates to any compounds containing at least one carbon-hydrogen bond.

63. The composite article according to any one of items 60 to 62, wherein at least 50% of the fibers in the composite article have a length of 5 mm or more, preferably wherein at least 50% of the fibers in the composite article have a length of 10 mm or more, more preferably wherein at least 75% of the fibers in the composite article have a length of 5 mm or more, even more preferably wherein at least 75% of the fibers in the composite article have a length of 10 mm or more, still more preferably wherein at least 75% of the fibers in the composite article have a length of 15 mm or more, most preferably wherein at least 75% of the fibers in the composite article have a length of 20 mm or more.

64. The composite article according to any one of items 60 to 63, wherein the composite article contains less than 10% by weight binder, preferably less than 5% by weight binder, more preferably less than 2% by weight binder, even more preferably less than 1% by weight binder, still more preferably less than 0.5% by weight binder, most preferably less than 0.1% by weight binder.

65. The composite article according to any one of items 60 to 64, wherein the composite article exhibits a total weight loss in thermogravimetric analysis (TGA) when being heated in a nitrogen atmosphere from 30° C. to 1100° C. with temperature increase of 10° C./min of less than 35% by weight, preferably less than 30% by weight, more preferably less than 25% by weight, even more preferably less than 20% by weight, still more preferably less than 15% by weight, most preferably less than 10% by weight.

66. The composite article according to any one of items 60 to 65, wherein the weight ratio of the one or more aerogels to the one or more fibers (aerogel/fiber) in the composite article is higher than 1:8, preferably 1:4 or higher, more preferably 1:2 or higher, even more preferably 1:1 or higher.

67. The composite article according to any one of items 60 to 66, wherein the composite article contains 15 to 70 wt.-%, preferably 25 to 60 wt %, more preferably 35 to 50 wt % aerogel based on the total weight of the composite article.

68. The composite article according to any one of items 60 to 67, wherein the composite article has a thickness in the range of 3 mm to 500 mm, preferably in the range of 3 to 100 mm, more preferably in the range of 3 to 50 mm, even more preferably in the range of 5 to 30 mm.

69. The composite article according to any one of items 60 to 68, wherein the composite article has a burn-through time of 60 minutes or more, preferably 120 minutes or more, even more preferably 180 minutes of more, still more preferably 240 minutes or more.

70. The composite article according to any one of items 60 to 69, when using the composite article in the form of a 20 cm×50 cm sheet with a thickness of 13 mm and treating the composite article at the full surface of its first major surface in accordance with the ISO 834 temperature-time curve for 180 minutes, the centre of the second major surface has a temperature of less than 900° C., preferably less than 800° C., more preferably less than 700° C., even more preferably less than 600° C., still more preferably less than 500° C.

71. The composite article according to any one of items 60 to 70, wherein, when the width of the composite article is W, the length of the composite article is L and the thickness of the composite article is T, the following requirement is fulfilled:

$$R = \frac{W \times L}{T^2}$$

wherein R is 100 or more, preferably 1000 or more, more preferably 10000 or more,
wherein W/L is preferably in a range of 1000/1 to 1/1000,
wherein W/T is preferably 10 or more, and
wherein L/T is preferably 10 or more.

The present application claims the priority of EP21161398, filed on 9 Mar. 2021 at the European Patent Office with the title composite article comprising aerogel particles and ceramic fibers, the contents of which are incorporated herein by reference.

EXAMPLES

Example 1

Materials

Aerogel powder (JIOS AeroVa Aerogel Powder, D20 Grade)
n-Hexane (technical grade)
Ceramic fiber blanket with a density of 128 kg/m³ and a thickness of 13 mm (Insulfrax® LIX™ Blanket supplied by Unifrax, contains 60 to 70 wt.-% silica and 30 to 40 wt.-% alkaline earth metal oxide)
Ceramic fiber blanket with a density of 96 kg/m³ and a thickness of 13 mm (Insulfrax® LIX™ Blanket supplied by Unifrax, contains 60 to 70 wt.-% silica and 30 to 40 wt.-% alkaline earth metal oxide)
Carbon black N550
Soldering torch (Rotenberger Industrial, Type ROFIRE Piezo 1950, 35429) equipped with a gas cartridge (Rotenberger Industrial, 30% Propane/70% Butane)

Experimental

The aerogel was dispersed using a standard lab mixing equipment, more specifically a propeller mixer (Heidolph overhead stirrer RZR2020) in n-hexane to reach a solid content of 11 wt-%.
0.1 g of carbon black were added per 1 L of aerogel dispersion to serve as marker for the injection process.
Preparation of Aerogel-Incorporated Ceramic Fiber Blankets:

1 L of aerogel dispersion (11 wt-% aerogel in n-hexane as prepared above) were injected at room temperature (20° C.) into a 30×30 cm ceramic fiber blanket either by manual step-by-step injection using a typical plastic medical syringe fitted with a detachable stainless steel needle or by using an in-house developed lab injection device. The sample was dried immediately after the injection in a hot-air oven at 110° C. for 4 h, followed by post-drying at 200° C. for 16 h.

TABLE 1

Preparation of aerogel-incorporated ceramic fiber blankets

| Example | Blanket type | Blanket density [kg/m³] | Blanket thickness [mm] | Aerogel content in dried prototype [wt. %] |
|---|---|---|---|---|
| 1-1 | Ceramic fiber | 128 | 13 | 40 |
| 1-2 | Ceramic fiber | 128 | 13 | 39 |
| 1-3 | Ceramic fiber | 128 | 13 | 42 |
| 1-4 | Ceramic fiber | 96 | 13 | 46 |
| 1-5 | Ceramic fiber | 96 | 13 | 44 |
| 1-6 | Ceramic fiber | 96 | 13 | 43 |

Results and Evaluation

Figure 2:
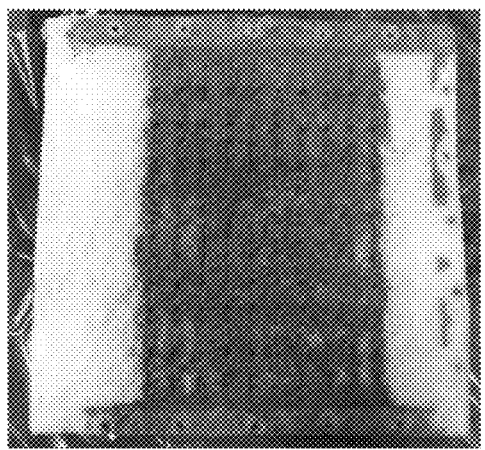
FIG. 2: Aerogel-incorporated ceramic fiber blanket (raw blanket density 96 kg/m$^3$) (Example 1-4) a) top view; b) side view
Figure 2:
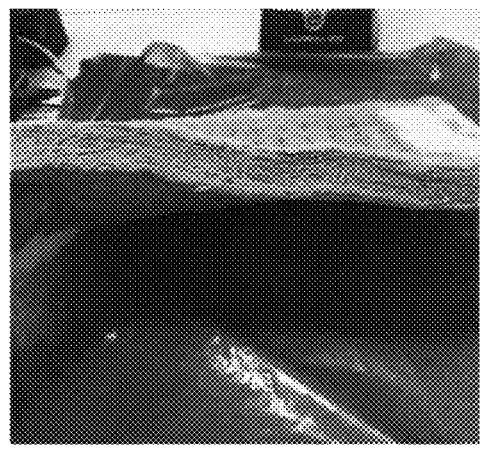

Homogeneous aerogel-incorporated ceramic fiber blankets were obtained, as shown in FIGS. 1 and 2. There was only a very slight increase in blanket thickness (by about 0.5 to 0.7 mm).

Figure 3:
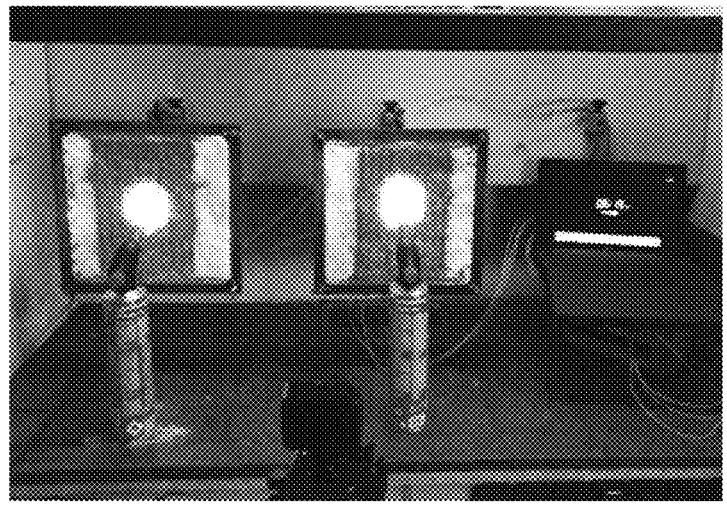
FIG. 3: Soldering torch test setup

In order to investigate the thermal insulation capability and the resistance to high temperature, the aerogel-incorporated ceramic fiber blankets as well as blank ceramic fiber blankets were exposed to a soldering torch flame, as shown in FIG. 3. The soldering torches had a flame temperature of around 1400° C. The temperature increase on the back side (non-flamed side) of the blankets was recorded by thermal couples.

Figure 4:
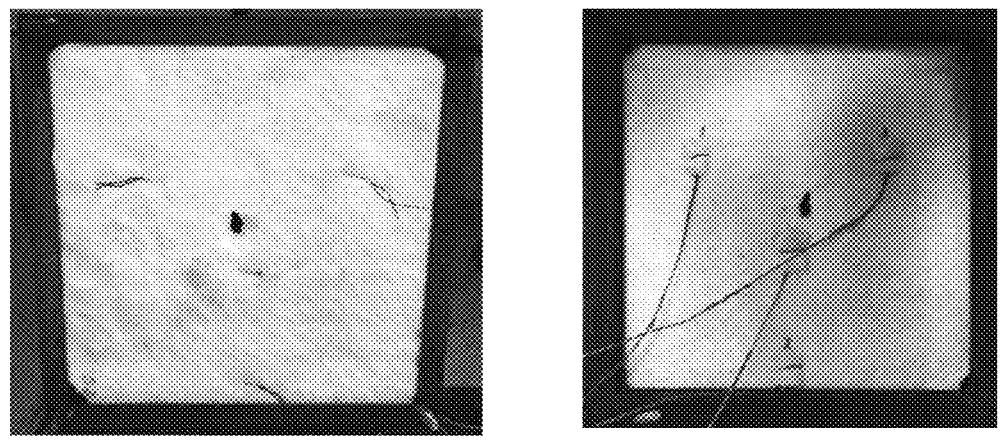
FIG. 4: Blank ceramic fiber blanket (raw blanket density 96 kg/m$^3$) after 10 min flaming; a) front view; b) back view
Figure 5:
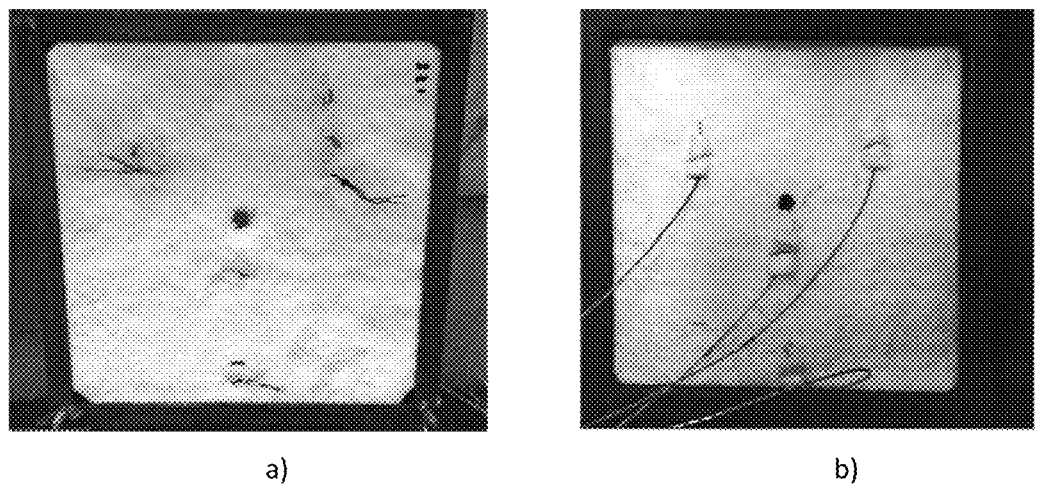
FIG. 5: Blank ceramic fiber blanket (raw blanket density 128 kg/m$^3$) after 30 min flaming; a) front view; b) back view

Although the blank ceramic fiber blankets are designed for high temperature applications and are nominally resistant to temperature up to 1200° C., the flamed sites on them gradually melted and completely burnt through after 7 min and 30 min for the blank ceramic fiber blanket with a density of 96 and 128 kg/m³, respectively, as shown in FIGS. 4 and 5.

Figure 6:
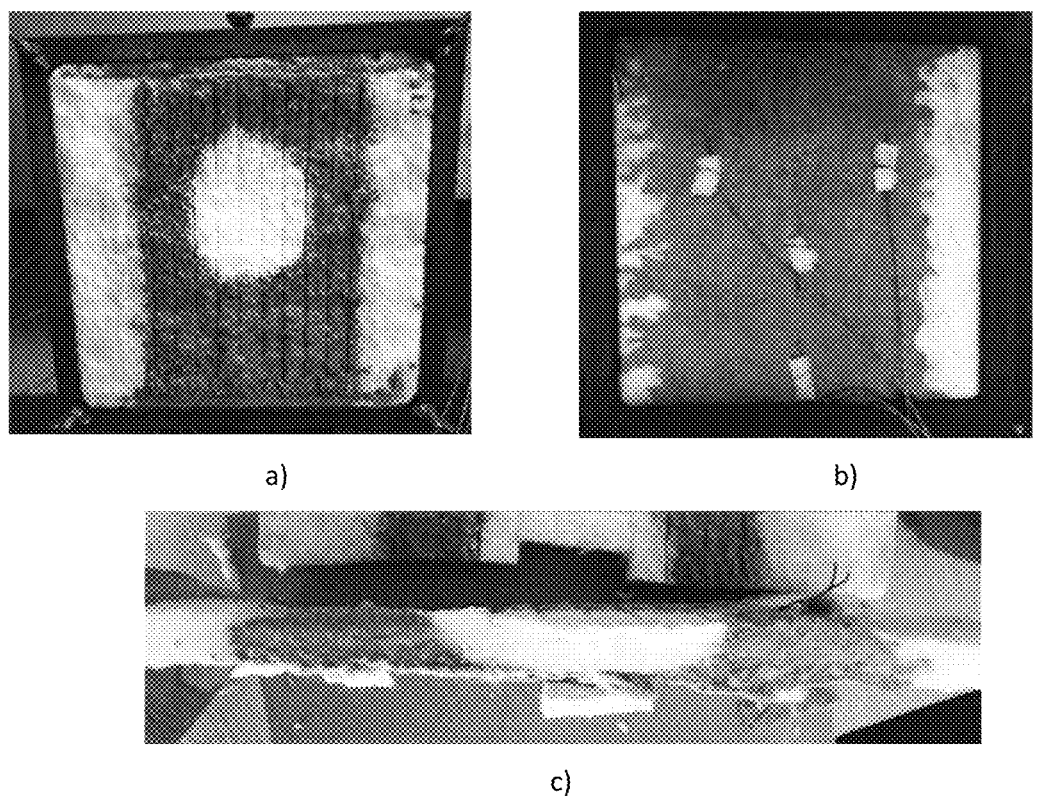
FIG. 6: Aerogel-incorporated ceramic fiber blanket (raw blanket density 128 kg/m$^3$) after 60 min flaming; a) front view; b) back view c) cross section of flamed area
Figure 7:
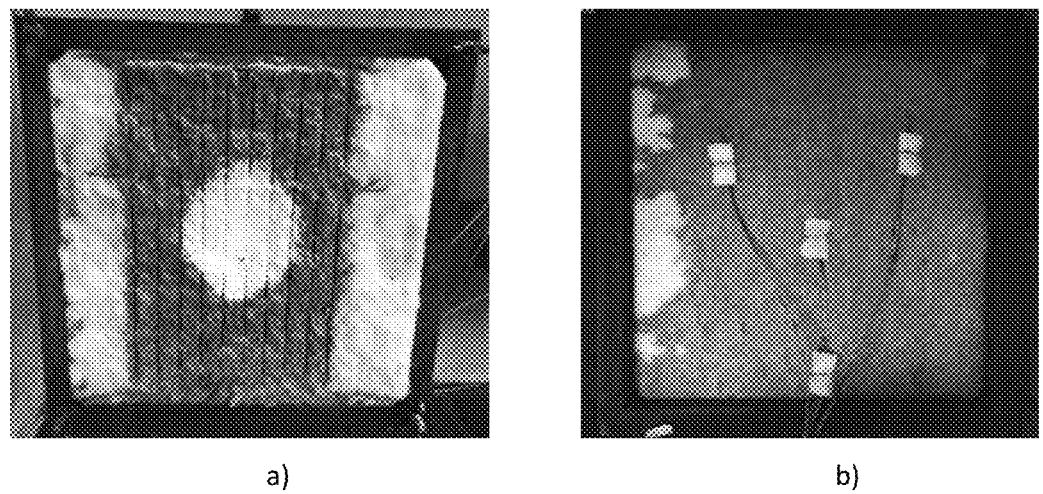
FIG. 7: Aerogel-incorporated ceramic fiber blanket (raw blanket density 96 kg/m$^3$) after 60 min flaming; a) front view; b) back view

In contrast to the blank ceramic fiber blankets, the aerogel-incorporated ceramic fiber blankets showed much better resistance to the torch flame. As shown in FIGS. 6 and 7, the aerogel-incorporated ceramic fiber blankets remained almost undamaged after being flamed for 60 min. The colour change of the flamed sites is due to the evaporation of the carbon black.

A cross-sectional analysis of the flamed area showed that only the very first surface (thinner than 0.5 mm) of the ceramic fiber blanket became rigid but the blanket as a whole remained flexible. The back side of the flamed area maintained the same colour as before the test.

Figure 8:
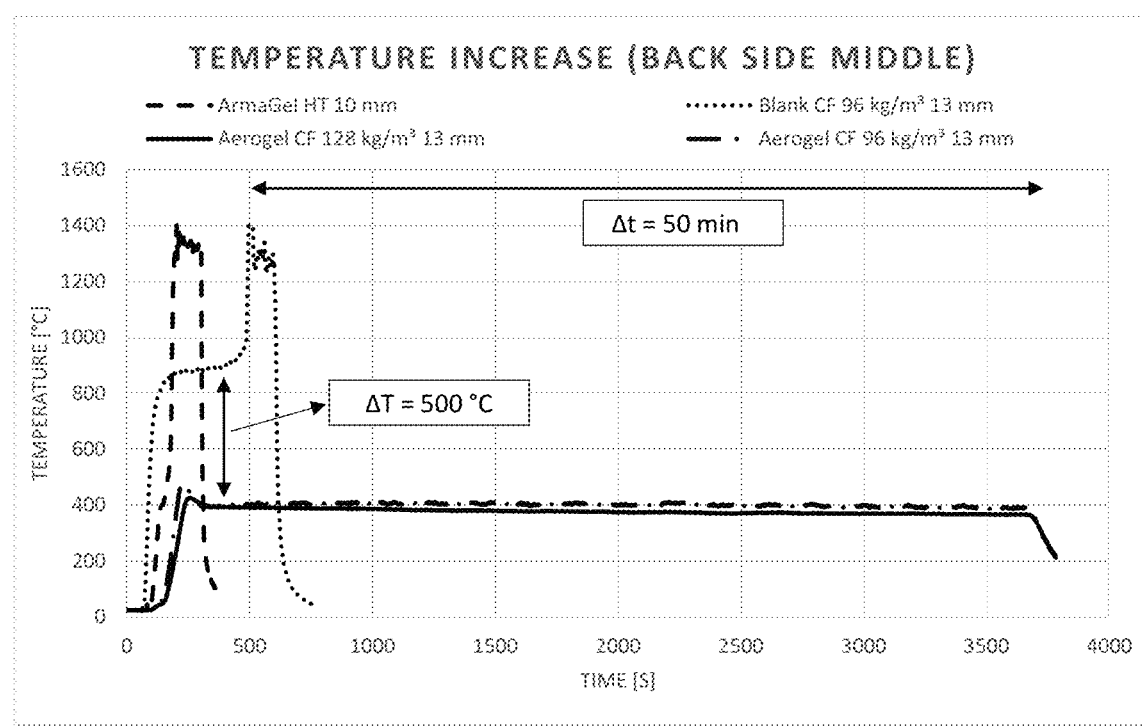
FIG. 8: Comparison of the temperature increase of the back side middle part among ArmaGel HT and two aerogel-incorporated ceramic fiber blankets as well as a blank ceramic fiber blanket

A comparison of the temperature increase of the back side middle part among the blank ceramic fiber blanket (96 kg/m³) and the two aerogel-incorporated ceramic fiber blankets is shown in FIG. 8.

The blank ceramic fiber blankets with a density of 96 kg/m³ showed a temperature increase to 900° C. after 60 s flaming. The temperature plateau at 900° C. lasted until 420 s and was followed by a sharp temperature increase to 1400° C., because the blanket burnt through.

In contrast, the aerogel-incorporated ceramic fiber blankets showed much better thermal insulation capability and resistance to high temperature. The temperature of the back side middle part was merely 400° C. and 370° C. for the aerogel-incorporated ceramic fiber blanket with density of 96 and 128 kg/m', respectively. Thus, the aerogel-incorporated ceramic fiber blankets withstood the torch flame for a much longer exposure period.

The comparison between the aerogel-incorporated ceramic fiber blankets and the blank ceramic fiber blankets shows that the incorporation of aerogel powder in the ceramic blankets can significantly improve the thermal insulation capability and the resistance to high temperatures.

Example 2: Comparison of a Commercially Available Aerogel Blanket Product and the Inventive Aerogel-Incorporated Ceramic Fiber Blanket As the comparative blanket, a Cabot Thermal Wrap TW800 blanket with a thickness of 8 mm was used. As the inventive blanket, the above described aerogel-incorporated ceramic fiber blanket with a thickness of 13 mm and an aerogel content of 39 wt. % was used.

The Cabot Thermal Wrap TW800 blanket has compact facings on both sides. In order to observe the morphological structure underneath the facing, the facings were removed carefully by using a sharp scalpel. During the removal of the facing, a significant spalling of aerogel granules was observed, which could be attributed to the poor adhesion of aerogel granules on the fibers.

Microscopic Imaging

The two specimens were observed under an Olympus Stereomicroscope SZX7 equipped with an Olympus DF Plapo 1×-4 objective, both for their surface and cross-section morphology. In the case of comparative blanket, microscopic imaging was conducted for both with and without facings. An inhomogeneous distribution of aerogel granules was observed both in its surface and cross-section morphology. A slight movement of the fibers lead to detachment of the aerogel granules, which indicates also a poor adhesion of aerogel granules on the fibers.

In the case of the inventive blanket, a homogeneous distribution of aerogel particles was observed both in its surface and cross-section morphology. The aerogel particles orientate regularly along the ceramic fibers. The adhesion of aerogel granules on the fibers withstands movements of the fibers under microscope.

Flexibility

The flexibility of the two specimens was tested by a bending test. During the test, a specimen with a dimension of 30×30 cm was bended to an edge-to-edge distance of 15 cm.

The comparative blanket showed crinkle formation due to the compact facings. In contrast, the inventive blanket can be bended without any crinkle issue.

Thermogravimetric Analysis (TGA)

TGA was conducted for both specimens by using a NETZSCH TG 209 F1 Libra device. The analysed temperature range was 23° C. to 1100° C. The TGA was conducted in pure nitrogen (from 23° C. to 600° C.) and in synthetic air (from 600° C. to 1100° C.).

The comparative blanket showed a total weight loss of about 38%, which is attributed to the significant decomposition transitions due to high level of organic binders. In contrast, the inventive blanket showed a total weight loss of only 5.92.

Pan Test

A pan test at 300° C. was conducted for both specimens to study their thermal oxidation behaviour in the presence of oxygen. In this test, a porcelain pan was heated to 300° C. in air by using a heating element HORO Brenner SVL. A specimen with a dimension of 1×2 cm was dropped into the heated porcelain pan.

The comparative blanket showed auto-ignition after being heated for 4 seconds in the porcelain pan. This could also be attributed to the high level of organic binders. In contrast, the inventive blanket showed a very stable behaviour in the pan test with no issue observed even after 10 minutes.

Fire Resistance Test

In order to study the fire resistance performance, a soldering torch test was conducted for both specimens. The specimens were cut into a dimension of 30×30 cm and were exposed to a soldering torch (Rotenberger Industrial, Type ROFIRE Piezo 1950, 35429) equipped with a gas cartridge (Rotenberger Industrial, 30% Propane/70% Butane), whose flame temperature was in the range of 1300-1400° C. On the back side (non-flamed side) of the specimen, thermal couples (type K) were installed in the middle location to record the temperature increase.

The comparative blanket was flamed for 10 seconds and kept burning by itself until completely burnt away within 2 min. Burning droplets scattered continuously from the specimen during the test. After ignition, the specimen burnt through within 5 seconds, and the thermal couples reached the flame temperature immediately. This clearly confirms that the Comparative blanket cannot be applied in passive fire protection.

Figure 9:
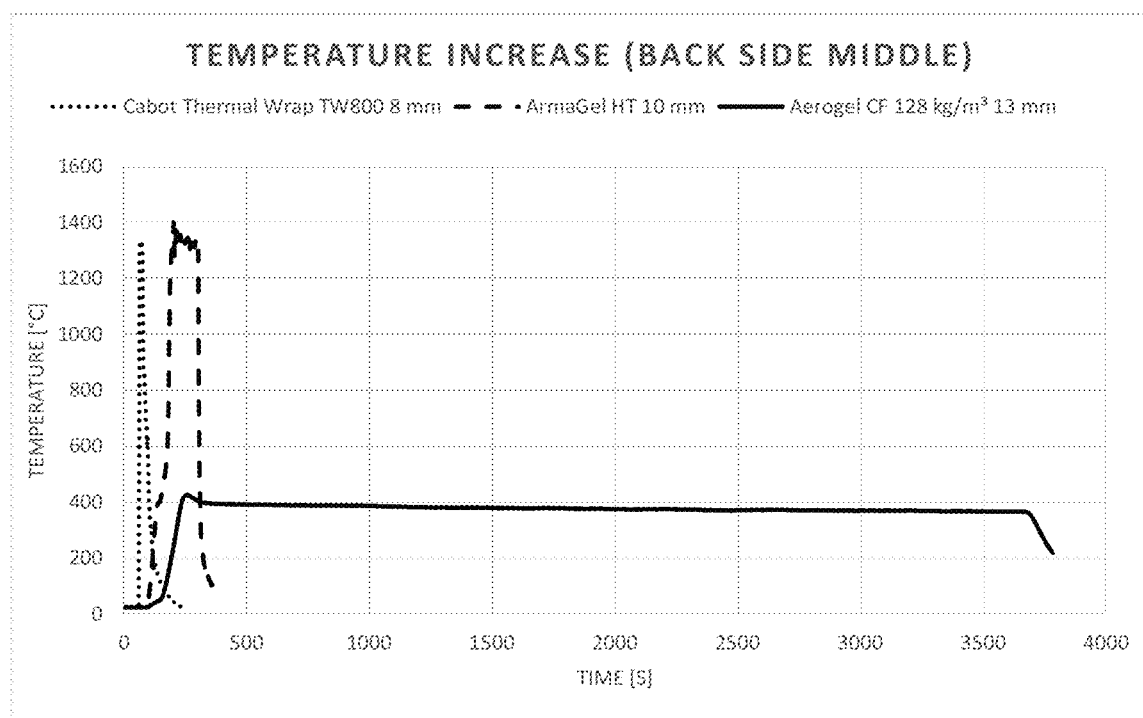
FIG. 9: Results of the fire resistance test of Example 2

In contrast, the inventive blanket showed a very stable behaviour in the fire resistance test. The specimen withstood the direct fire impingement for >60 min and showed a constant temperature plateau at around 370° C. on the back side. The results of the fire resistance test are also shown in FIG. 9.

Example 3

Materials

E-glass Fiber Needle Mat with a density of 110 kg/m³ and a thickness of 8 mm (supplied by Lih Feng Jing, contains 52-56 wt-% $SiO_2$, 12-16 wt-% $Al_2O_3$, 0-6 wt-% MgO, and 15-25 wt-% CaO, 4-9 wt-% $B_2O_3$, 0-1 wt-% $Na_2O+K_2O$);

Aerogel powder (JIOS AeroVa Aerogel Powder, D20 Grade);

Magnesium dihydroxide (BP-65, supplied by Chemmate);

Manganese ferrite black spinel (Bayferrox 303T, supplied by Lanxess);

Silicon carbide with a particle size $D_{50}$ of 4 to 5 μm (SiC30, supplied by Beijing Weina Chaoxi Material Ltd.);

n-Hexane (technical grade);

Natural macrocrystalline graphite with a particle size $D_{50}$ of 6 to 10 μm (Graphit M8-94, supplied by Georg H. LuH GmbH)

Experimental

The aerogel dispersions in n-Hexane were prepared in a similar way as described in Example 1, with the difference of including manganese ferrite, graphite, silicon carbide, or mixtures thereof. The composition of the aerogel dispersions used to prepare Examples 3-1 to 3-5 are given in the Table 2.

TABLE 2

Aerogel dispersions incl. opacifiers in n-Hexane

| Dispersion | Aerogel content [wt-%] | Opacifier | Opacifier content [wt-%] | Magnesium dihydroxide content [wt-%] |
|---|---|---|---|---|
| 3-1 | 10.8 | Manganese ferrite | 1.5 | 0.3 |
| 3-2 | 10.8 | Graphite | 1.5 | 0.3 |
| 3-3 | 10.8 | Silicon carbide (SiC) | 1.5 | 0.3 |
| 3-4 | 10.8 | Graphite/manganese ferrite | 0.75/0.75 | 0.3 |
| 3-5 | 10.8 | Graphite/SiC | 0.75/0.75 | 0.3 |

Preparation of the e-Glass Blankets Incorporated with Aerogel and Opacifier(s):

1 L of aerogel dispersion (as prepared above, cf. Table 2) was impregnated at room temperature (20° C.) into a 30×30 cm e-glass blanket. The sample was dried immediately after the impregnation in a hot-air oven at 110° C. for 4 h. The composition of the obtained prototypes is given in Table 3.

TABLE 3

E-glass blankets incorporated with aerogel and opacifier(s)

| Example | Aerogel content [wt-%] | Opacifier | Opacifier content [wt-%] | Magnesium dihydroxide content [wt-%] |
|---|---|---|---|---|
| 3-1 | 39.8 | Manganese ferrite | 5.5 | 1.0 |
| 3-2 | 37.7 | Graphite | 5.3 | 1.0 |
| 3-3 | 38.8 | Silicon carbide (SiC) | 5.4 | 1.0 |
| 3-4 | 38.6 | Graphite/manganese ferrite | 2.7/2.7 | 1.0 |
| 3-5 | 38.2 | Graphite/SiC | 2.7/2.7 | 1.0 |

Example 3-1 is defined as the reference sample: aerogel-incorporated fibrous article with manganese-ferrite opacifier (content of 5.5 wt-% of the composite article).

Example 3-2 is an aerogel-incorporated fibrous article which contains graphite as opacifier (content of 5.3 wt-% of the composite article, a comparable total weight of opacifier as in the reference sample).

Example 3-3 is an aerogel-incorporated fibrous article which contains silicon carbide as opacifier (content of 5.4 wt-% of the composite article, a comparable total weight of opacifier as in the reference sample).

Example 3-4 is an aerogel-incorporated fibrous article with a 50:50 weight ratio of graphite opacifier to manganese-ferrite opacifier (content of 2.7:2.7 wt-% of the composite article, a comparable total weight of combined opacifiers as in the reference sample).

Example 3-5 is an aerogel-incorporated fibrous article with a 50:50 weight ratio of graphite opacifier to silicon carbide opacifier (content of 2.7:2.7 wt-% of the composite article, a comparable total weight of combined opacifiers as in the reference sample).

Thermal Conductivity Measurement of Examples 3-1 to 3-5

Figure 10:
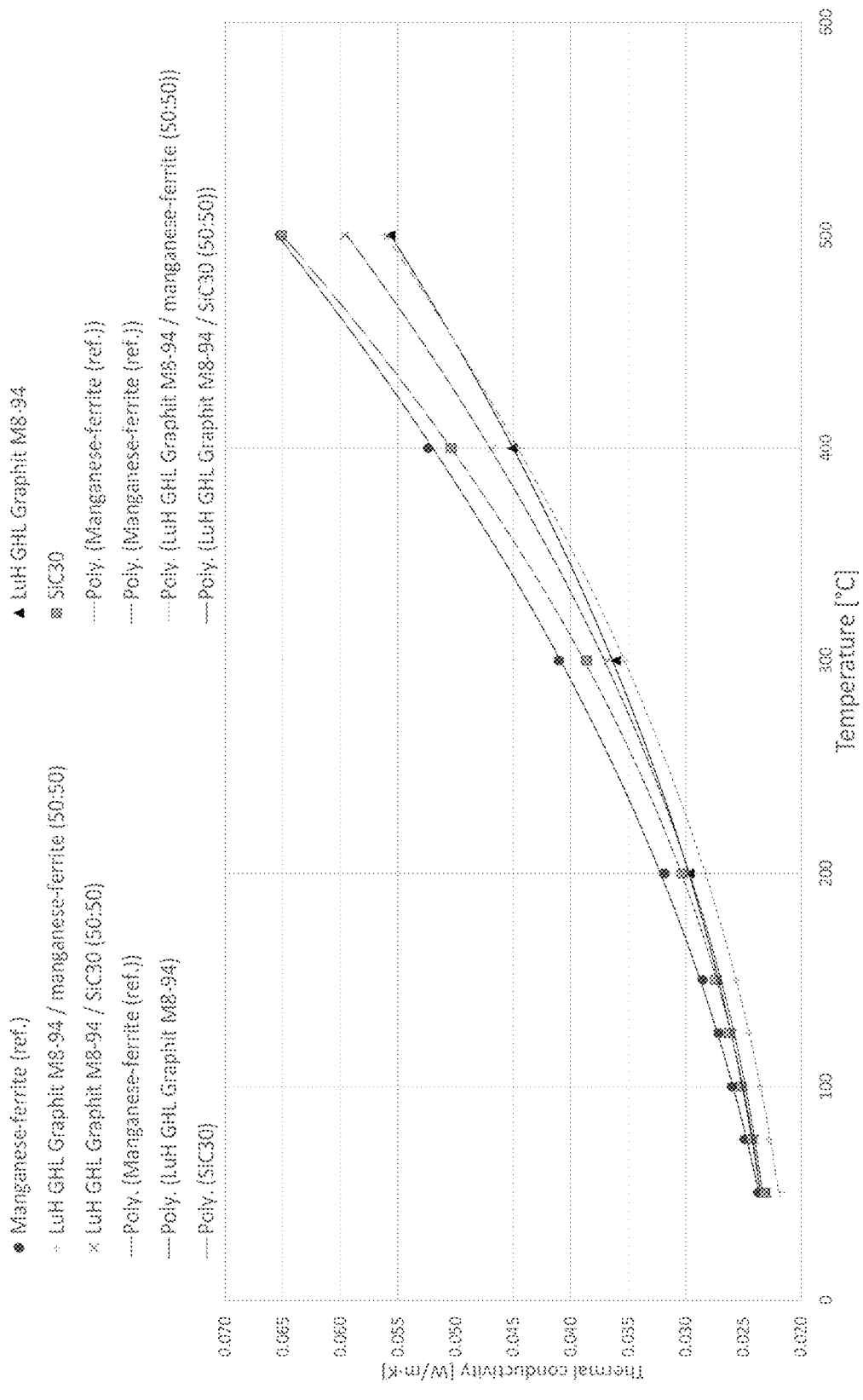
FIG. 10: Thermal conductivities of manganese-ferrite, graphite, silicon carbide, a 50:50 mixture of manganese-ferrite and graphite, and a 50:50 mixture of silicon carbide and graphite as opacifiers in aerogel blankets in a temperature range of from 50 to 500° C.

All thermal conductivities were measured on a Netzsch GHP-456 Titan in a temperature range from 50-500° C. under nitrogen atmosphere at 20K differential temperature cold to hot side. All data of the comparative evaluation are shown in FIG. 10.

Results and Evaluation

Comparison of Manganese-Ferrite, Graphite and Silicon Carbide as Sole Opacifier

Thermal conductivity was measured on a Netzsch GHP-456 Titan in a temperature range of from 50 to 500° C. The full exchange of the manganese-ferrite standard opacifier against graphite resulted in a significant decrease of thermal conductivity in particular above 200° C. when compared against the reference sample using manganese-ferrite as opacifier (Table 4).

TABLE 4

Comparison of manganese-ferrite opacifier with graphite opacifier and silicon carbide opacifier

| | | Thermal Conductivity [W/(m · K)] | | |
|---|---|---|---|---|
| | Mean Temperature [° C.] | Example 3-1 (Reference sample): manganese-ferrite | Example 3-2: graphite | Example 3-3: silicon carbide |
| 1 | 50 | 0.02370 | 0.02313 | 0.02321 |
| 2 | 75 | 0.02490 | 0.02438 | 0.02426 |
| 3 | 100 | 0.02601 | 0.02533 | 0.02519 |
| 4 | 125 | 0.02716 | 0.02619 | 0.02620 |
| 5 | 150 | 0.02856 | 0.02732 | 0.02746 |
| 6 | 200 | 0.03187 | 0.02969 | 0.03033 |
| 7 | 300 | 0.04101 | 0.03607 | 0.03863 |
| 8 | 400 | 0.05237 | 0.04506 | 0.05038 |
| 9 | 500 | 0.06523 | 0.05567 | 0.06510 |

Comparison of Manganese-Ferrite as Sole Opacifier with Graphite/Manganese-Ferrite Mixture, and Graphite/Silicon Carbide Mixture as Opacifier Thermal conductivity was measured on a Netzsch GHP-456 Titan in a temperature range of from 50 to 500° C. Using the 50:50 weight ratio of manganese-ferrite to graphite resulted in a significant decrease of thermal conductivity in particular above 200° C. when compared against the reference sample using only manganese-ferrite as opacifier (Table 5).

Moreover, all thermal conductivities of Example 3-4 at a temperature lower or equal than at 400° C., are lower than in Example 3-2, indicating a synergistic effect of the chosen combination of graphite and manganese-ferrite in Example 3-4.

TABLE 5

Comparison of manganese-ferrite opacifier with mixed opacifier

| | | Thermal Conductivity [W/(m · K)] | | |
|---|---|---|---|---|
| | Mean Temperature [° C.] | Example 3-1 (Reference sample): manganese-ferrite | Example 3-4: graphite/ manganese-ferrite (50:50) | Example 3-5: graphite/silicon carbide (50:50) |
| 1 | 50 | 0.02370 | 0.02177 | 0.02299 |
| 2 | 75 | 0.02490 | 0.02276 | 0.02403 |
| 3 | 100 | 0.02601 | 0.02362 | 0.02499 |
| 4 | 125 | 0.02716 | 0.02453 | 0.02596 |
| 5 | 150 | 0.02856 | 0.02567 | 0.02714 |
| 6 | 200 | 0.03187 | 0.02823 | 0.02980 |
| 7 | 300 | 0.04101 | 0.03538 | 0.03678 |
| 8 | 400 | 0.05237 | 0.04447 | 0.04683 |
| 9 | 500 | 0.06523 | 0.05612 | 0.05960 |

Thus, a synergistic effect was observed when using a mixture of graphite with manganese-ferrite mixed in a 50:50 ratio by weight, which expresses itself in even lower thermal conductivities at temperatures lower than or equal to 400° C. Exemplary Delta TC values in comparison against the reference sample of manganese-ferrite are up to 9.5 mW/m*K at 500° C., 3.7 mW/m*K at 200° C. and 2.4 mW/m*K at 100° C.

FIG. 10 shows a graphical representation of the thermal conductivities of Examples 3-1 to 3-5 in the temperature range of from 50 to 500° C.

The invention claimed is:

1. A method for the preparation of a composite article comprising aerogel particles, graphite and ceramic and/or glass fibers, the method comprising:

providing a fibrous article comprising ceramic and/or glass fibers, providing an aerogel composition comprising an aerogel powder, graphite and an organic solvent, combining the fibrous article and the aerogel composition, and partially or completely removing the organic solvent to obtain the composite article.

2. The method for the preparation of a composite article according to claim 1, wherein the ceramic fibers contain 80 wt.-% or more of alumina, wherein the ceramic fibers contain less than 2 wt.-% of components other than silica and alumina, based on the total weight of the ceramic fibers.

3. The method for the preparation of a composite article according to claim 1, wherein the ceramic fibers contain 2 to less than 80 wt.-% alumina and 10 to 98 wt.-% of silica, based on the total weight of the ceramic fibers.

4. The method for the preparation of a composite article according to claim 1, wherein the ceramic fibers contain less than 2 wt.-% alumina, and contain 50 to 85 wt.-% silica and 15 to 50 wt.-% alkaline earth metal oxide.

5. The method for the preparation of a composite article according to claim 1, wherein the organic solvent is a hydrocarbon solvent or an alcohol solvent or any mixture thereof.

6. The method for the preparation of a composite article according to claim 1, wherein the aerogel is silica aerogel.

7. The method for the preparation of a composite article according to claim 1, wherein the aerogel has a porosity of 85% or higher, as determined by isotherm adsorption and desorption.

8. The method for the preparation of a composite article according to claim 1, wherein the aerogel has a specific surface area of 300 $m^2/g$ or higher, as determined by DIN ISO 9277 2003-05 (Determination of the specific surface area of solids by gas adsorption using the BET method).

9. The method for the preparation of a composite article according to claim 1, wherein the aerogel composition is a dispersion of the aerogel powder in the organic solvent, and the combined content of aerogel powder and organic solvent in the aerogel composition is 90 wt.-% or more, based on the total weight of the aerogel composition.

10. The method for the preparation of a composite article according to claim 1, wherein the fibrous article and the aerogel composition are combined by injecting, or impregnating or soaking the aerogel composition into the fibrous article.

11. The method for the preparation of a composite article according to claim 1, wherein the composite article contains 15 to 70 wt.-% aerogel based on the total weight of the composite article.

12. The method for the preparation of a composite article according to claim 1, wherein at least 50% of the fibers in the composite article have a length of 10 mm or more.

13. The method for the preparation of a composite article according to claim 1, wherein the weight ratio of the one or more aerogels to the one or more fibers in the composite article is 1:4 or higher.

* * * * *